US007565155B2

(12) United States Patent
Sheha et al.

(10) Patent No.: US 7,565,155 B2
(45) Date of Patent: Jul. 21, 2009

(54) METHOD AND SYSTEM FOR DYNAMIC ESTIMATION AND PREDICTIVE ROUTE GENERATION

(75) Inventors: Michael A. Sheha, Laguna Niguel, CA (US); Angie Sheha, Laguna Niguel, CA (US); Stephen Petilli, Laguna Niguel, CA (US); Arun Yarlagadda, Irvine, CA (US)

(73) Assignee: Networks In Motion, Irvine, CA (US)

( * ) Notice: Subject to any disclaimer, the term of this patent is extended or adjusted under 35 U.S.C. 154(b) by 0 days.

(21) Appl. No.: 10/410,740

(22) Filed: Apr. 10, 2003
(Under 37 CFR 1.47)

(65) Prior Publication Data

US 2005/0075119 A1    Apr. 7, 2005

Related U.S. Application Data

(60) Provisional application No. 60/371,941, filed on Apr. 10, 2002.

(51) Int. Cl.
*H04Q 7/20* (2006.01)
(52) U.S. Cl. .............. 455/456.1; 455/456.2; 455/456.3; 455/456.5; 701/201; 701/204; 701/208; 340/992; 340/993
(58) Field of Classification Search ... 455/456.1–456.7; 701/201, 204, 208, 209, 211; 340/992, 993, 340/994
See application file for complete search history.

(56) References Cited

U.S. PATENT DOCUMENTS

| 4,939,662 | A | | 7/1990 | Nimura et al. |
| 5,508,930 | A | * | 4/1996 | Smith, Jr. .................... 701/201 |
| 5,727,057 | A | | 3/1998 | Emery |
| 5,731,788 | A | * | 3/1998 | Reeds .................... 342/357.07 |
| 5,798,733 | A | * | 8/1998 | Ethridge ................. 342/357.08 |
| 5,802,492 | A | | 9/1998 | DeLorme et al. |
| 5,904,727 | A | | 5/1999 | Prabhakaran |
| 6,032,097 | A | * | 2/2000 | Iihoshi et al. .................. 701/96 |
| 6,049,718 | A | | 4/2000 | Stewart |
| 6,084,951 | A | | 7/2000 | Smith |
| 6,091,957 | A | | 7/2000 | Larkins et al. |
| 6,125,278 | A | * | 9/2000 | Wieczorek et al. .......... 455/437 |
| 6,185,426 | B1 | | 2/2001 | Alperovich et al. |
| 6,208,934 | B1 | | 3/2001 | Bechtolsheim et al. |
| 6,226,367 | B1 | | 5/2001 | Smith |
| 6,321,158 | B1 | | 11/2001 | DeLorme et al. |
| 6,353,664 | B1 | | 3/2002 | Cannon |

(Continued)

FOREIGN PATENT DOCUMENTS

GB    2305568    4/1997

(Continued)

*Primary Examiner*—Tuan A Pham
(74) *Attorney, Agent, or Firm*—Morrison & Foerster LLP

(57) ABSTRACT

The preferred embodiments of the present invention are directed to methods and systems for dynamic route estimation and prediction using discrete sampled location updates from various mobile devices for the purpose of providing a graphical representation of a mobile device's route along a known network path of map data. The embodiments also provide supplemental route metrics, such as traveled distance, elapsed time, etc., and the capability to assign destination points for the purpose of providing the ability to modify location update points in an application, such as a route planner, and/or to store the dynamically generated route based on various preferences for later retrieval.

57 Claims, 28 Drawing Sheets

U.S. PATENT DOCUMENTS

| | | |
|---|---|---|
| 6,377,210 B1 | 4/2002 | Moore |
| 6,459,782 B1 | 10/2002 | Bedrosian |
| 6,526,268 B1 * | 2/2003 | Marrah et al. ............ 455/186.1 |
| 6,529,143 B2 | 3/2003 | Mikkola et al. |
| 6,539,080 B1 | 3/2003 | Bruce |
| 6,603,405 B2 * | 8/2003 | Smith ......................... 340/905 |
| 6,643,516 B1 | 11/2003 | Stewart |
| 6,674,849 B1 | 1/2004 | Froeberg |
| 6,714,859 B2 * | 3/2004 | Jones ......................... 701/201 |
| 6,766,174 B1 | 7/2004 | Kenyon |
| 6,775,371 B2 | 8/2004 | Elsey |
| 2001/0054036 A1 * | 12/2001 | Bouve et al. ................... 707/3 |
| 2002/0052786 A1 | 5/2002 | Kim et al. |
| 2002/0053985 A1 * | 5/2002 | Nesbitt ....................... 340/994 |
| 2002/0059201 A1 | 5/2002 | Work |
| 2003/0061211 A1 | 3/2003 | Shultz et al. |
| 2003/0144795 A1 * | 7/2003 | Lin ............................ 701/213 |
| 2004/0140909 A1 * | 7/2004 | Meadows et al. ........... 340/905 |
| 2004/0148332 A1 * | 7/2004 | Parolkar et al. ............. 709/200 |
| 2004/0153239 A1 * | 8/2004 | Krull et al. .................. 701/209 |
| 2004/0229595 A1 | 11/2004 | Laursen |

FOREIGN PATENT DOCUMENTS

| | | |
|---|---|---|
| WO | WO 96/36930 | 11/1996 |

* cited by examiner

METHOD AND SYSTEM FOR DYNAMIC ESTIMATION AND PREDICTIVE ROUTE GENERATION

CROSS-REFERENCE TO RELATED APPLICATIONS

Embodiments of the present invention claim priority from U.S. provisional patent application Ser. No. 60/371,941, filed Apr. 10, 2002.

BACKGROUND OF THE INVENTION

1. Field of Invention

The present invention is directed to systems and methods for dynamic route estimation and prediction using discrete sampled location updates from various mobile devices, and to also provide supplemental information such as route metrics, including without limitation traveled distance and elapsed time.

2. Description of the Related Art

Computerized mapping software is achieving widespread use today. Such mapping programs are commonly used to automate tasks of calculating routes, viewing location-specific geographical areas for their spatial content, such as addresses, roadways, rivers, etc., and for the purpose of being used with Global Positioning System (GPS) devices for various applications, such as a personal navigation application. Mapping software programs apply to a wide variety of uses, such as personal navigation, telematics, thematic mapping, resource planning, routing, fleet tracking, safety dispatching (i.e., Police, Fire, and Rescue organizations), and a wide variety of specialized Geographic Information System (GIS) applications, all of which are well known to people skilled in the art.

Real-time communication networks today also provide the ability to transfer, in real-time, voice and data information from various mobile devices, such as wireless phones, telemetry devices, or the like, to a multitude of other devices, either mobile or stationary, all of which are well known to people that are skilled in the art. For example, GPS devices that are connected to a wireless MODEM are able to transfer their position coordinates, such as latitude and longitude, wirelessly to a computer or server for later retrieval or real-time viewing of said information. Current applications that integrate or combine mapping, real-time communication capabilities, and position devices, for various computing devices are well known to people skilled in the art. These applications are referred to by various terminologies, including, but not limited to Automatic Vehicle Location (AVL), Location-Based Services (LBS), Fleet Tracking Systems, etc., all of which are well known to people skilled in the art.

Conventional systems, such as AVL systems, typically involve a positioning device connected to a wireless MODEM sending location information, amongst other telemetry information, at discrete time intervals to a computer for the viewing of said information. This monitoring, or tracking, of real-time location information or of location-history information is sometimes referred to as the breadcrumb trail or history information of the mobile device, since it illustrates the current and/or previous locations that the mobile device is or has been in space and time. The problem with the conventional system is that the 'breadcrumb' trail does not provide the user with sufficient information about the mobile device's actual or estimated route during the course of its travels, but only provides discrete location information over a specified period of time. How the mobile device traveled along the underling routable network infrastructure, such as roads, highways, exit ramps, etc., from point-to-point is not provided in prior art.

Conventional applications will sometimes associate the term 'route' with a breadcrumb trail that directly connects discrete points with straight lines, but this is not an accurate use of the term as known to people that are skilled in the art. For example, a route is typically defined as a road, course, or way for traveling from one place to another over a set of various defined paths, such as a route along a highway. True routing applications include a network of paths that are used in combination with destination points, where destination points can include both an origin and stop points, in order to determine a specific route along said network paths between each of the destination points.

Conventional systems widely use this method of connecting direct lines between location updates for illustrating the breadcrumb trail path and direction between location updated points. Some conventional systems further illustrate the order of the location updates that the mobile device traveled by chronologically numbering each of the location updates or by connecting a direct line from each point, or drawing an arrow at each point, with an arrow illustrating the mobile device's heading or pseudo heading. The problem with the conventional system is that these methods and systems do not provide the user with any actual or estimated route information derived from the location updates, specifically due to the discrete nature of the location data. As people skilled in the art will appreciate, a method and system that can create a dynamic estimated route between various discrete locations would provide a number of improvements over existing prior art, such as providing a better illustration of the data, which has inherent limitations due to its being discrete location data, extrapolating total driving distance from a set of discrete location updates, and providing to the user an ability to save the calculated estimated route or plan new routes from the existing location information.

Thus, a need exits for a method and system that allows an application to dynamically generate estimated route information from location updates originally derived from a mobile positioning device. Until now, an adequate solution to these problems has eluded those skilled in the art. Thus, there exists a need to provide a solution that enables an application to dynamically generate, based on various route generation preferences, estimated and predictive routes using location information that was generated from a mobile positioning device sending discrete location updates of its position over various periods of time. This provides many important benefits for computing devices that receive discrete position updates for the purpose of monitoring, planning, and analysis of mobile devices' positional information.

SUMMARY OF THE INVENTION

It is an object of the present invention to provide a method and system for enabling dynamic estimated routing calculations between location points generated from a mobile device with access to its own location (i.e., position) information, and also displaying said calculated route on a map display of varying size and resolution. In one embodiment, a wireless mobile device transmits its location information by means of a centralized server where the location data is routed to the specific destination device, either stationary or mobile. The device initially displays the first location point on the map display that has either a visible or transparent underlying road network. The next location update that arrives from the mobile device, indicating its next position, is preferably displayed similarly to the first location update, and a dynamically estimated route is generated in real-time based on a set of route preferences and displayed on the map display between the two location points. In this embodiment, if the location updates do not intersect the pathways of the road network exactly, the points used in the route calculation are a result of the location points being snapped to the nearest road pathway or segment for the purpose of enabling the route calculation.

It is another object of the present invention to provide a method and system for enabling predictive dynamic routing calculations between location points in real-time as they arrive from a mobile device that has access to its own location information. Predictive routing provides the user or application with estimated predicted route calculation information between location updates based on various preferences, such as origin and destination information, map data information (e.g., road speed limits, one-way information, etc.), mobile device information (i.e., heading, speed, vehicle type, etc.). Predictive routing is based on one or more known location updates and is calculated from the time an initial location update arrives to the time when the next location update arrives. Predictive routing is preferably further augmented when the destination information is known in advance, but the various points between the origin and destination are not known. In one embodiment, an initial location update is provided and the destination location is known in advance. Using the initial location update, and various other aiding information, such as vehicle vector information such as heading, speed, etc., an estimated route can be calculated in pseudo real-time using the vector information of the device along with some destination information. In another embodiment, when destination information is not provided, the predicted route is calculated and displayed in all possible directions that routes can exist.

It is another object of the present invention to provide a method and system for displaying the dynamic route calculated using discrete location update information on a mobile or stationary computing device. In one embodiment, a mobile device would send discrete location information in a peer-to-peer connection to another mobile device, such as an in-vehicle navigation device, for the display of the remote mobile device's location information and for real-time dynamic route calculation of the remote mobile device's travels or to the remote mobile device's current location. In another embodiment, the mobile device would send discrete location information by means of a distributed server system that routes the location information to a stationary dispatch computer or group of computers. In both cases, the display and calculation of dynamic route information is similarly performed.

It is another object of the present invention to provide a method and system for providing a set of route preferences for use in calculating dynamic route information. The route preferences can be specific to each device thus allowing a more precise approximation of the actual versus estimated route traveled by the mobile device. In one embodiment, route preferences, when using map data that consists of road networks for motor vehicles, includes various types of categories, such as Driving Speeds, Route Optimization Goals, Road Preferences, etc. For example, Driving Speeds illustrates average speeds the vehicle travels over various types of roads, such as Interstate Highways Average Speed, Other Highways Average Speed, Arterial Roads Average Speed, Surface Streets Average Speed, or the like. In this embodiment, Route Optimization Goals illustrates either the Fastest Route or the Shortest Route, while Road Preferences illustrates whether the motor vehicle typically avoids Highways, Arterial Roads, or Toll Roads. These and other preferences allow the dynamic route calculation to closer approximate the actual route most likely traveled by the vehicle.

It is another object of the present invention to provide a method and system for providing the route to be calculated from a known infrastructure of network paths, such as a road, highway, exit, ramp, etc., which is usually associated with the type of map data, such as road, nautical, aviation, topographical, or the like. In one embodiment, after two or more location updates are used to calculate a route, the system uses map data, such as road map data, to calculate an estimated or predictive route.

It is another object of the present invention to provide a method and system for providing the capability to correlate location information with a known set of network pathways associated with the particular map data for determining the point on the network pathways nearest to the location information. This allows the route calculation to be the most accurate when using location updates that typically have some positional error associated with them, and when using map data that also has its own positional error. In one embodiment, a mobile device is attached to a positioning device, such as a GPS receiver, that has a positional error typically on the order of 2-15 meters. Map data consists of various segments of roadways, each of which typically has it own positional error, sometimes on the order of 2-50 meters. Since both the mobile device and the map data typically have some positional error, and it is necessary to calculate a route using the map data, the map data is preferably used as the datum, and the mobile device's location information is "snapped-to" the nearest point or segment on the map data. That is, the location used for route calculation is preferably the point on the network pathways of the map data nearest to the actual mobile device's location. This allows the dynamic route calculation to be as accurate as possible relative to the map data and location updates from the mobile device.

It is yet another object of the present invention to provide a method and system for enabling the mobile device to send location updates to a receiving device or devices (i.e., broadcast) directly, in a peer-to-peer configuration, where the receiving device or devices can be client-type devices, either mobile or stationary, or server-type devices. In one embodiment, a mobile device is connected to a GPS receiver that transmits its location information, via a wireless communication network and the Internet, preferably at a frequency of one update per second (i.e., 1 Hz) to another mobile device connected to a different wireless communication network and is connected to the Internet. In another embodiment, a mobile device sends its updated position information intermittently and directly (i.e., peer-to-peer) to an online server-computing device via a wireless communications network and the Internet.

It is yet another object of the present invention to provide a method and system for enabling the mobile device to send location updates to a receiving computing device, either a client or server, by means of a server, such as a centralized or distributed server system, that acts as a router and directs the location updates to the specific receiving computing and/or server device or devices (i.e., broadcast), which are either mobile or stationary. In one embodiment, a mobile device is connected to a GPS receiver that transmits its location information, via a wireless connection and the Internet, preferably at a frequency of one update every half a second (i.e., 2 Hz) to a centralized server that is connected to the Internet and routes the location information to a stationary computing device by means of an Internet connection.

In an alternative embodiment, a mobile device transmits its position information periodically to a server that routes the location packet updates to another server component or system for storage and real-time or future dynamic estimated route calculation, performed at the server component or system and then delivered to the stationary or mobile computing device. In this embodiment, the location packet updates can be directly delivered to the stationary or mobile computing device, in real-time or from storage on the server, and the estimated route calculation would be performed at the stationary or mobile computing device. In yet another embodiment, the estimated route calculation can be preformed on the server, and then delivered to the stationary or mobile computing device.

It is yet another object of the present invention to provide a method and system for enabling the mobile device to store location updates to a local storage medium, such as a hard disk drive or flash memory, on the mobile device at various or specific intervals. The mobile device can then calculate and display the estimated route information of the mobile devices' journey locally. Additionally, the mobile device can transfer the location information to a remote client directly (i.e., peer-to-peer) or to a server (i.e., peer-to-server), which can then deliver the location information to a client (i.e., server-to-peer), which may include the estimated route already calculated. The transfer to the remote client and/or server can occur using various transfer methods, such as wireless (e.g., Bluetooth, 802.11, etc.), infrared, wired (i.e., USB cable, etc.), or storage transfer (i.e., floppy disk, etc.). In one embodiment, a mobile device stores location information over a period of time, and then, using a wireless connection, transmits its location information to an in-vehicle navigation system, which calculates estimated route information using the discrete location updates that the mobile device recorded. Additionally, the transfer to the in-vehicle navigation system could consist of using a floppy disk drive to transfer said location update information.

It is yet another object of the present invention to provide a method and system for calculating estimated and predicted route information using various map data sets and location update information either on the end client application, such as a graphical user interface (GUI) local application, or on a server application. The end client and server applications can calculate the route estimation and prediction information in real-time, or can store the location information (i.e., location history information) and calculate the route estimation at a later time for delivery to the end user or client. Specifically, the server application can calculate, in real-time or on demand (using stored location history), the estimated route information for delivery to the end client (i.e., mobile or stationary computing device), either through a web interface (i.e., Web Browser), web service, or other communication protocol and interface. The server application can also calculate the route estimate information and store the results on the server for future deliver to the end client. The end client can also calculate the route estimation and prediction information in real-time or store the location history information for post-processing the route estimation information after it has been stored locally, such as in memory or in the local computing device's hard disk drive, optical disk drive, etc.

In one embodiment, a wireless mobile device sends its location information to an online server, via a wireless communication network and the Internet, every 60 seconds. The server routes the location information to an end client that dynamically, and in real-time, calculates and displays the estimated route information of the mobile wireless device as the location updates arrive at the end client through the Internet connection to the online server. In another embodiment, a wireless mobile device sends its location information to an online server, via a wireless communication network and the Internet, every period of predetermined time interval. The server stores the location history information into an online server database. At a later time, and using a web browser, the user of the mobile wireless device preferably logs onto the online server and request to see the location history information of their trek, including the estimated route information. A server application component uses, from the database, the stored location history records for the mobile device for the time past and pre-defined general route preferences to calculate the estimated route information for the specific mobile device's journey on a known map data set. In this embodiment, the location information points and estimated route information are displayed to the mobile device's user via a web browser end client.

It is still another object of the present invention to provide a method and system for sending an information packet, accompanied with every discrete location packet, that provides additional information about the location point. In the event when a location update was not scheduled to be transmitted and an information packet is transmitted, depending on the type of location packet type, an ad-hoc location update can also be transmitted accompanying the information packet. The additional information contained in this information packet consists of various location-related information, such as stop information (e.g., origin, stop, via, destination), waypoint information (e.g., personal notes, etc.), PIM (Personal Information Management) information, Point of Interest (POI) information (e.g., restaurants, gas stations, etc.), or the like. In one embodiment, such as a dispatch application, a user of a wireless mobile device, such as a wireless phone, arrives at a customer's location and enters the location and other appropriate information about the customer into an application on the wireless mobile device. The wireless mobile device then either locally stores the location and additional information, or remotely transmits the information to the remote client or online server.

It is still another object of the present invention to provide a method and system for providing the capability of adding the location update information (i.e., position information, such as GPS, etc.) and/or location information generated by a mobile device (i.e., POI, waypoint, etc.) to a route planner for the purpose of modifying the collection of discrete location history information. In one embodiment, location updates periodically arrive to a dispatch client from a mobile wireless device. The location updates can then be transferred to a route planner application that allows the modification of the location update points prior to calculating the estimated route information. For instance, if a location update illustrates a point on a specific highway, but the mobile device should have been traveling on a different highway, then that point can be moved to the appropriate highway prior to the calculation of the estimated route. Additionally, the estimated route can be calculated prior to modifying the location history update information or in real-time as the location updates arrive, since the estimated route information provides graphical information that would aid the user in modifying the location history information. In another embodiment, as location updates arrive to a dispatch client, the location update points are typically defined as via points, but the via points can be changed to other destination points, such as a stop, origin, or destination end point, thus providing route planning capabilities on the discrete location updates. Additionally, these destination points can be accompanied by additional information, such as notes, start/departure time, stop duration, etc.

It is still another object of the present invention to provide a method and system for saving, either on a server or locally, the calculated estimated route information and/or the location history information including the specific route preferences used to calculate the route. The estimated route information range (i.e., date, time, position, etc.) can be selected to indicate the starting and ending point boundaries for the route and/or location history information to be saved. In one embodiment, location updates periodically are received via the Internet and are displayed on a map display. With every location update received, an estimated route is calculated based on various route preferences. The user can select the displayed location history information with estimated route information and save it locally or to a remote server. Additionally, the user can select a subset of the entire estimated route and/or location history information and save only that portion to the local hard disk drive or flash memory, or to the online server for retrieval from other networked devices.

It is still another object of the present invention to provide a method and system for calculating estimated route information, such as driving distance, using discrete sampled location update information and based on various user or device-defined route preferences. In one embodiment, using location history information, an estimated route is calculated based on a set of user route preferences (e.g., shortest time, etc.). After an estimated route has been created based on the location history information and various route preferences, the total driving distance can then be computed. A subset of information can also be illustrated, such as driving instructions (i.e., Turn Right onto Lawrence Road, etc.), heading, distance, and elapsed time for each portion of the estimated route, including summary information for the estimated route, such as total driving distance traveled.

It is still another object of the present invention to provide a method and system for calculating an estimated route for multiple location-relevant 'satellite' points, such as a mobile device, to or from a 'central' destination or origin location point, where the estimated route is calculated relative to a known set, or sets, of map data, and the resulting estimated routes are ordered according to various metrics. These ordering calculation metrics may include preferences such as shortest time, shortest distance, most use of highways, most use of surface streets, least amount of traffic, least amount of cost, such as fuel usage for each mobile satellite and/or central point (which in this case can be considered to be a mobile motor vehicle), or the like. The central satellite destination or origin point can be a place, such as a POI (i.e., address, house, landmark, etc.), or a stationary or mobile device, where the mobile device's location is provided in real-time or from a cached location either locally, where the estimate route is calculated, or on the server system. The estimated route is based on various route preferences such as Driving Speeds, Route Optimization Goals, Road Preferences, etc., where each of the satellite points and/or central point can have estimated routes based on individual route preferences for each mobile or stationary point. The satellite points or central point can include real-time location updates from mobile devices, and known position points, such as POIs (i.e., stationary points), or the like. In one embodiment, an application defines an entered address as the central point, which is, for this embodiment, a stationary point.

Using the location updates from the mobile devices surrounding the general area of the address, the application calculates in real-time an estimated route from each of the satellite mobile devices to the central address. The application then uses the total travel distance of the estimated route from each of the mobile devices to the central address location and calculates the estimated travel time for each mobile device to travel from their current location to the central address location. This time calculation is based on various route preferences and map data for each of the satellite mobile devices, such as the posted driving speed of the roads, number of stop lights required and the typical time spent at each stop light, etc. After calculating the estimated distance and time for each satellite mobile device (i.e., satellite implies surrounding the central address point), the mobile devices are preferably ranked or sorted based on various metrics, such as distance, time, fuel usage, etc. In another embodiment, the central point is another mobile device, and using real-time location updates, the estimated routes are dynamically calculated, in real-time, for a mobile device when an update on its location is received.

Details of the various embodiments of the present invention will be further explained below.

DETAILED DESCRIPTION OF THE EMBODIMENT

The various embodiments of the present invention will now be described with references to FIGS. 1-26.

The present invention provides a method and system for creating, storing, and displaying dynamic route prediction and estimation using discrete sampled location update information. The dynamic route prediction and estimation can be further augmented using additional information pertaining to the location points, such as stop or waypoint information. Additional route information can be obtained from this method and system including various route metrics, such as total elapsed distance, etc. The present invention may be embodied within or along with a mapping and real-time communication application.

Figure 1:
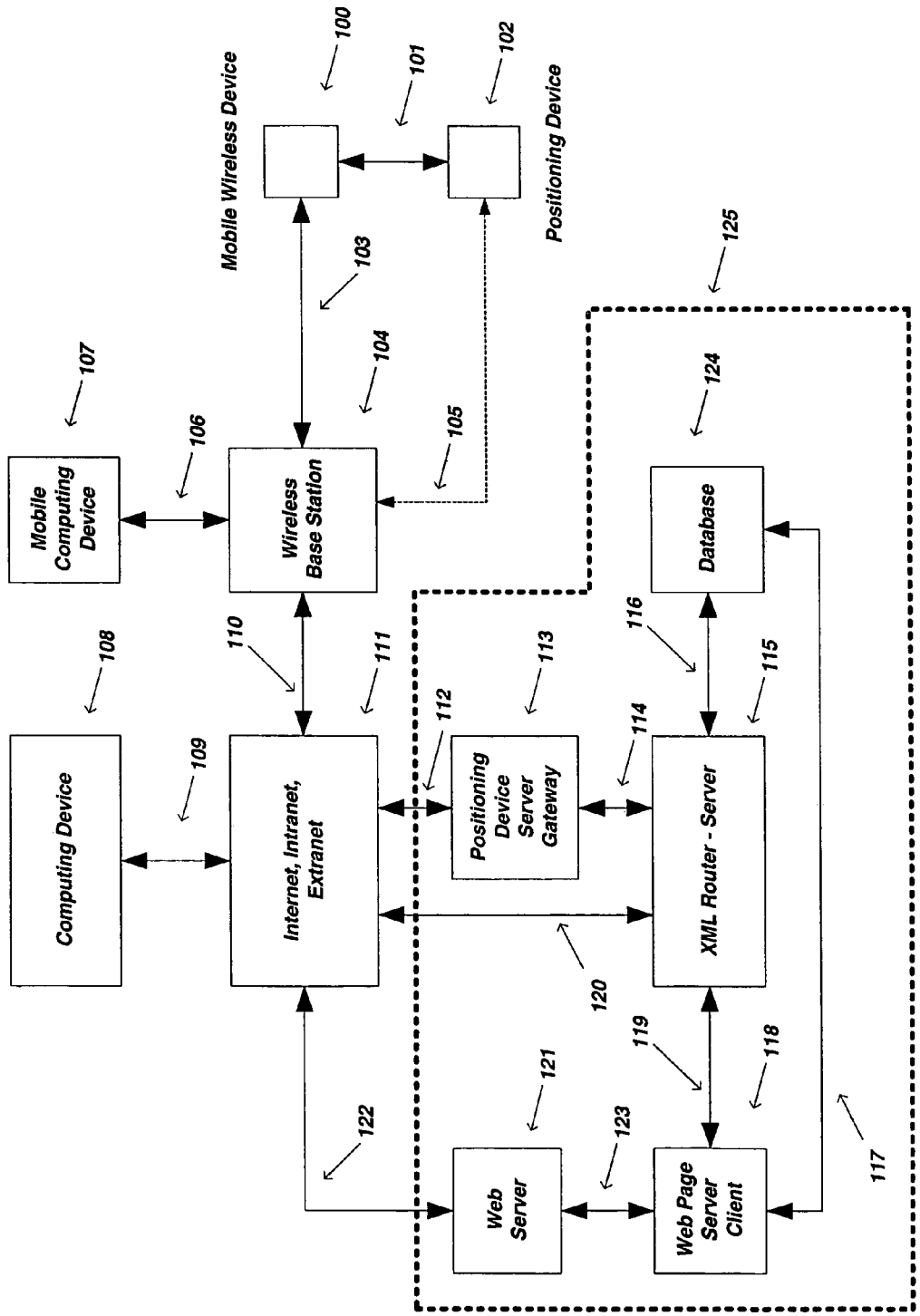
FIG. 1 illustrates a network system for providing a communication channel between various different computing devices.

FIG. 1 illustrates a high-level diagram of an environment in which the invention may be implemented. The embodiment of the present invention will be described in the general context of an application that executes on an operating system in conjunction with a personal computer or server, but those skilled in the art will realize that this invention may also be implemented in combination with other program modules. Furthermore, this invention is not limited to a typical personal computer, but may also be utilized with other computing systems, such as handheld devices, mobile laptop computers, wireless phones, in-vehicle navigation systems, programmable consumer electronics, mainframe computers, distributed computer systems, etc., and the like.

FIG. 1 illustrates a network server and client system for sending and receiving packets of data information, such as location updates, and includes a typical mobile positioning device, such as a wireless device, but those skilled in the art will appreciate that this may also include an optical or wired mobile device. The mobile device 100 includes or is attached via a connection interface 101, to a positioning device 102, such as a GPS receiver. In one embodiment, the position device can receive position-aiding information by mean of a wireless connection, either a separate wireless connection 105 or by means of the primary wireless connection 103 that the wireless device uses to send data wirelessly to the wireless base station 104. The wireless base station 104 provides the interface, typically a connection 110 to the Internet, Intranet, or Extranet 111, but those skilled in the art will appreciate that the connection may include a wireless communication network, such as a telephone network. Additionally, other mobile computing devices 107 can also be supported by the wireless base station 104 through various types of connections 106, such as a TDMA, CDMA, or the like, connection. In one embodiment, there are preferably five primary architectures of routing location updates, amongst other location-relevant information, to the local or to other computing devices, which may be either a stationary 108 or mobile computing device 107, or a server system 125, or the like. In this embodiment, a server system preferably includes a XML router 115 for routing the location update packets, a position device server gateway 113 that connects to various mobile devices, a database 124 for storing the location information, a web page server client 118 for calculating on the server the estimated route information, and a web server 121 for delivering the location information or estimated route information to the end client. The various primary architectures for routing location updates preferably include:

1. Local Display, No Routing of Location Updates.
2. Peer-to-Peer
3. Peer-to-Server, then Server-to-Peer
4. Peer-to-Local Storage Device, then Local Storage Device (i.e., Peer)-to-Peer
5. Peer-to-Local Storage Device, then Local Storage Device (i.e., Peer)-to-Server, then to Peer The first architecture does not route its location updates, but only displays them on the mobile computing device's 100 local display.

The second routing architecture is a peer-to-peer (P2P) model. In this embodiment, a P2P architecture includes a mobile wireless device 100 that obtains its position updates through various interfaces 101 or positioning devices 102, all which are known to those skilled in the art. The location update is routed from the mobile wireless device 100, through the wireless connection 103 to the wireless base station 104. The wireless base station 104 then routes, typically using an IP (i.e., TCP or UDP) protocol, to the appropriate other device, which is either a mobile device 107 connected 106 using the same or different wireless base station 104, or is a stationary computing device 108, which is typically connected 109 to the Internet, or the like. The remote peer can also be a server system 125 that would receive, calculate, and display the route information (i.e., estimated route information, predictive route information, total distance traveled, etc.).

A third route architecture is a peer-to-server (P2S), then a server-to-peer (S2P) model. In one embodiment, a P2S architecture is similar to the P2P architecture, except that the end device is a server. In this embodiment, the wireless mobile device 100 obtains its location information from a positioning device 102. The discrete location update information is then transmitted 103 to the wireless base station 104 that is connected 110 to the Internet 111. The server system's 125 positioning device gateway 113 is also connected 112 to the Internet 111, and is capable of receiving location update packets from the mobile wireless device sending said packets. Thus the mobile wireless device 100 is capable of transmitting its discrete location update information to the server system (i.e., P2S). The same, or another client, such as a stationary computing device 108 (i.e., a personal computer) is also connected 109 to the Internet 111. The stationary computing device 108 has a connection to the server system 125 preferably by means of the XML Router 115, that is also connected to the Internet 111. If the discrete location packets are sent by the mobile wireless device 100, they arrive at the server system's 125 positioning device gateway, and are then preferably routed 114 to the XML Router 115 which then forwards the location packets to the stationary computing device 108 via the Internet 111 and the XML Router's Internet connection 120. The discrete location packets are then sent to the stationary computing device 108 preferably by means of a dedicated Internet connection 109, which is the S2P part of the third routing architecture. In another embodiment, the peer device in the S2P portion of the model could be a different mobile device 107, or even the same mobile device 100 that is transmitting the location updates.

It should be noted that the location information could also be obtained by means of a server connected to the mobile wireless device 100 at its location, thus sending the location update information directly to the Internet 111, or the like, and to the server system 125. This scenario also applies for all of the other architectures of routing location update information. As it will be appreciated to those skilled in the art, the position information obtained for calculating the discrete location information can vary across networks that use various technology implementations, such as E-OTD, TOA, AOA, gpsOne from Qualcomm, SnapTrack Servers, Assisted-GPS, etc., which are known to those skilled in the art.

A fourth architecture includes a mobile device (i.e., where the mobile device does not need to be a wireless device, such as a non-wireless Personal Digital Assistant (PDA)) that captures the location information from a positioning device and stores it locally, such as in its hard disk drive, optical drive, local memory (i.e., Flash, SDRAM, etc.), floppy disk drive, etc. The mobile device can then transfer its stored discrete location information to another computing device, either stationary or mobile, using various methods. These transfer methods include, but are not limited to, the use of an infrared connection, floppy disk, Bluetooth connection, removable hard drive, or the like. This architecture is denoted as a peer-to-peer local (i.e., storage device) transfer, followed by a peer-to-peer transfer (P2L-P2P).

A fifth architecture includes a mobile device that captures location history and stores it locally as previously mentioned. At a later point in time, the location history information is transferred to the online server system 125 through the previously mentioned methods, or the like. Once the data is stored on the server, the S2P model can be used to retrieve the store information. Location history information can be stored completely on the server and, by request, be transferred to an end peer client, such as a stationary computing device 108 or a mobile computing device 107 using either a wireless 106 or dedicated landline connection, such as an Ethernet cable.

As illustrated in FIG. 1, the end clients, such as the stationary computing device 108 or mobile computing device 107, can directly interact with each other through the provided system, or directly with the server systems 125. For instance, a personal computer 108 can request to view estimated route information through a web server application 118 that interfaces to the server system's 125 database 124. The web server application 118 can display the estimated route information to the stationary computing device 108 using its interface 123 to the web server 121, the web server's connection 122 to the Internet 111, and a dedicated connection 109 from the Internet 111 to the stationary computing device 108. The estimated route information, in this embodiment, is calculated on the server system 125 in the web server application 118 and displayed to the end client 108 using the web server 121.

In another embodiment, the discrete location history information is transferred from the server system 125 to the end client 108 by the primary means of the Internet 111 and the direct connections that interface 120, 122 to the Internet with the end client 108 and XML Router 115. The XML Router 115 routes the location history information to the end client 108 from its storage place in the database 124 contained in the online server system 125. The estimated route information is then preferably calculated and displayed on the end client 108. The online server system 125 is displayed as a centralized server system, but can also embody a distributed server system, which is well known to those skilled in the art.

Figure 2:
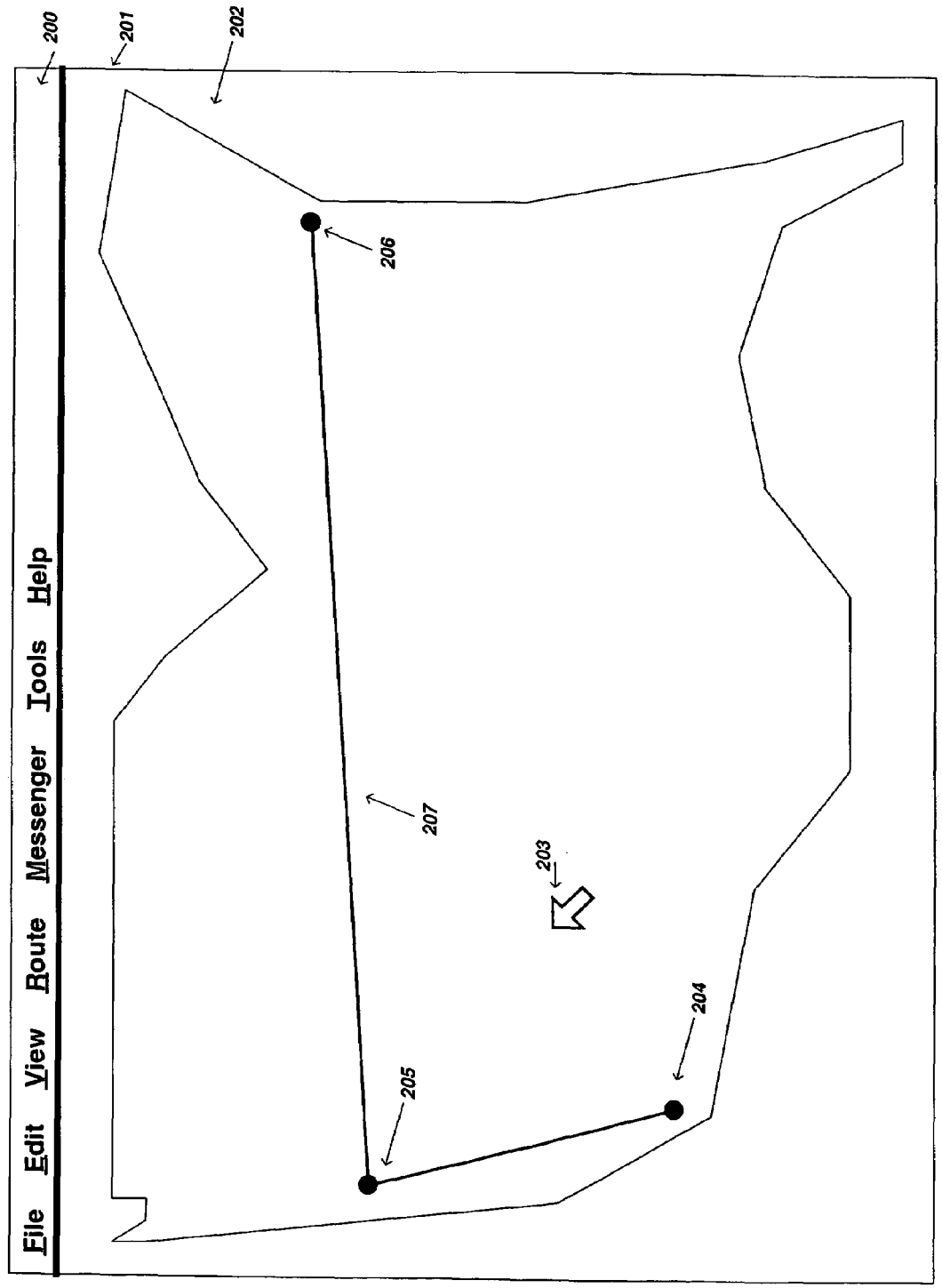
FIG. 2 illustrates an aspect of the present invention showing a real-time communications program with an integrated mapping environment that graphically displays various location-relevant objects on a map.

FIG. 2 illustrates an application screen display of the Real-Time Communication and Mapping Program (RTCMP) 201 with a map display of several geographical objects in a map window 202 below a menu bar 200. The map display 202 contains a route estimate 207 starting with an initial point 204 (i.e., origin), an intermediate point 205 (i.e., via or stop), and an end point 206 (i.e., destination). A typical graphical users interface (GUI) program (i.e., RTCMP) 201 is best utilized with an icon pointer 203, typically known as a mouse icon pointer to those skilled in the art. A route 207 preferably includes an origin 204 and one or more destination points 205 & 206, which can each be considered a "link". The route is illustrated as a series of links, such as link between the origin point 204 and the first destination point 205. It should be noted and appreciated to those skilled in the art that a link is not typically a straight line as illustrated in the sample map, but rather follows the topography of the roadways calculated between two route points, such as an origin 204 and destination 205 point. However, for simplicity, all links are illustrated as straight lines.

Figure 3:
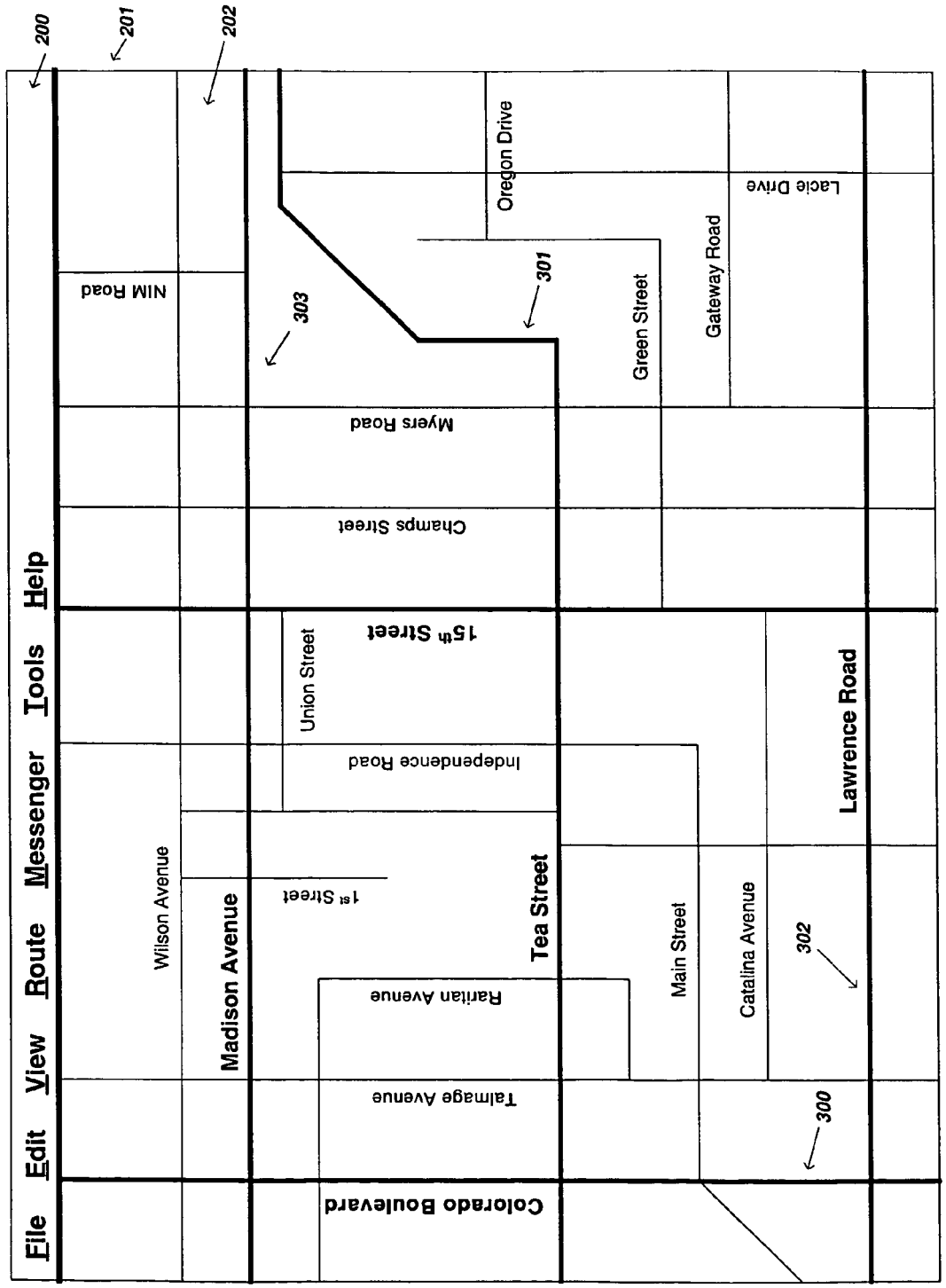
FIG. 3 illustrates another aspect of the present invention for graphically displaying a road network of streets in a map display.
Figure 4:
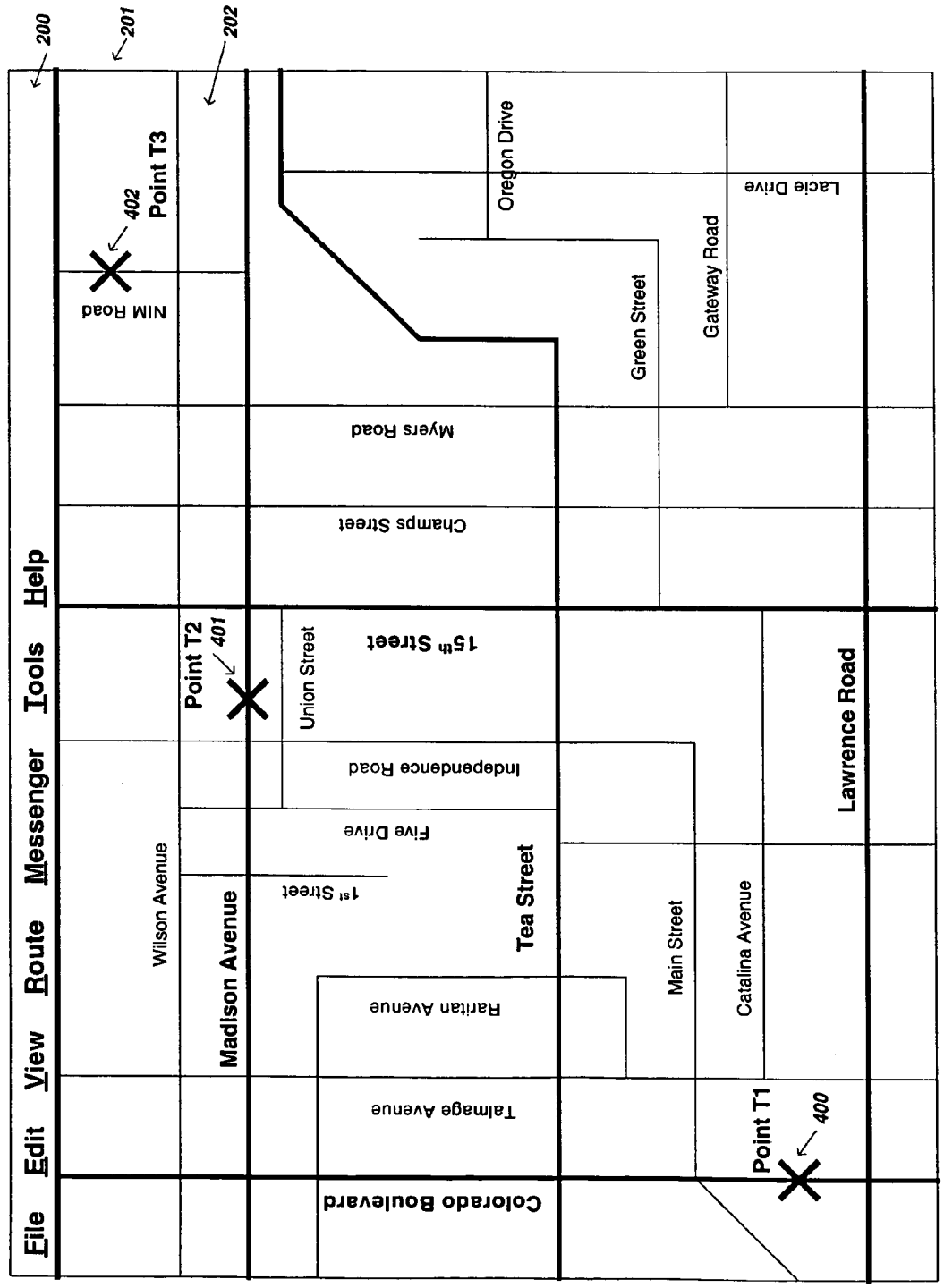
FIG. 4 illustrates another aspect of the present invention for dynamically plotting various location update points on a map display that originated from a mobile device.

FIG. 3 illustrates a map display 202 that shows a network of streets, such as Colorado Boulevard 300, Lawrence Road 302, Madison Avenue 303, and Tea Street 301, amongst other surface streets. FIG. 4 illustrates a series of location updates, such as Point T1 400 (Colorado Blvd.), Point T2 401 (Madison Ave.), and Point T3 402 (NIM Rd.). These location updates illustrate the course of a mobile vehicle's path versus time, as illustrated in FIG. 4B. Note in FIG. 4B that the location updates can arrive asynchronously and independently of each other relative to the other location updates (i.e., they are mutually exclusive). For instance, Point T1 423 arrives at an initial time, while Point T2 424 arrives at a significantly later time compared to the time difference between Points T2 424 and T3 425.

It should be noted and appreciated to those skilled in the art that location update points, such as Point T1 400 of FIG. 4, have a positional error associated with it, typically referred to as a circular error probability or error radius. This error radius is due to the original calculation of the position coordinates on the device or by using the device's characteristics (e.g., Time-of-Arrival (TOA) Location Estimation), and is typically due to the datum used, GPS satellite orbit error, multipath, or the like. Additionally, map data also has its own inherent positional error typically associated with every element, such as a highway or surface street. The goal for calculating the estimated route, as people skilled in the art will appreciate, is to correlate the location update position of the mobile device with the most likely position on the map data. Once a point in the map data has been chosen, or Snapped-To, estimated and/or predicted routes can be calculated with greater efficiency and accuracy.

Figure 4A:
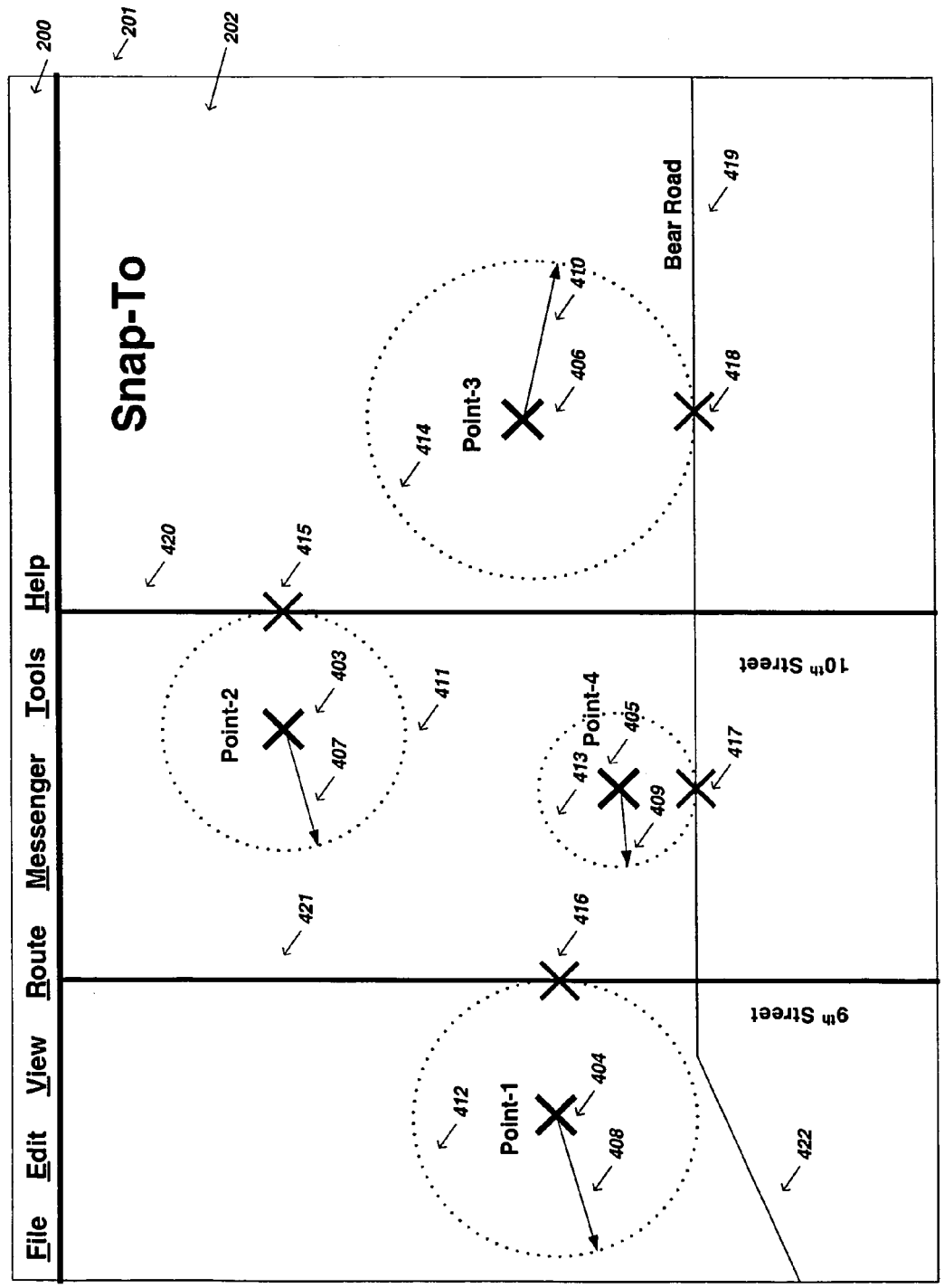
FIG. 4A illustrates another aspect of the present invention for using a snap-to algorithm for determining the line segment of the map data that is nearest to location updates from a mobile device.
Figure 4B:
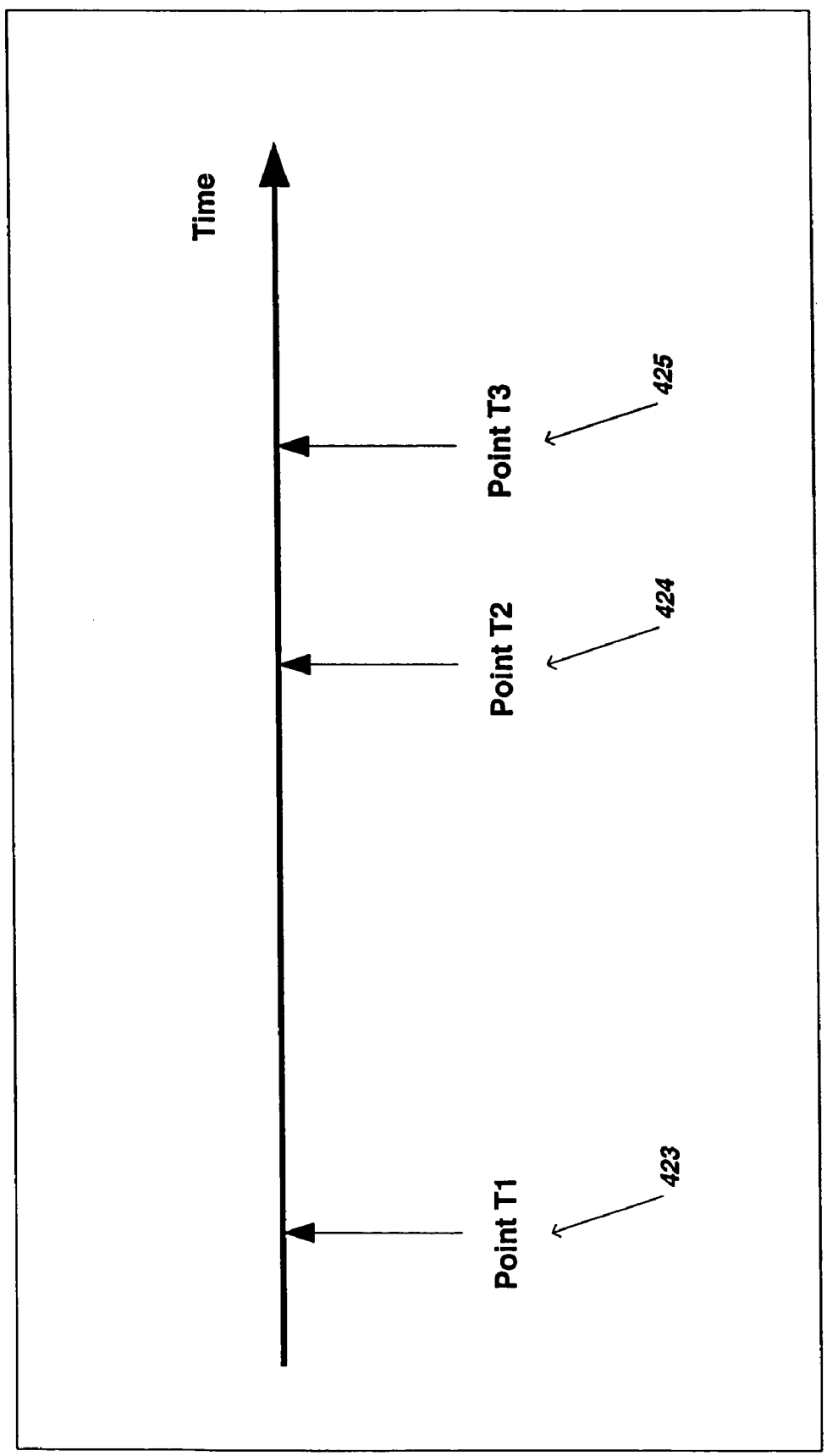
FIG. 4B is a pictorial example of how location update information can arrive both asynchronously and synchronously from a mobile device.

FIG. 4A illustrates several location updates 404, 403, 406, & 405 each with its own positional accuracy superimposed on the map data's positional accuracy of roads, such as 9$^{th}$ Street 421, 10$^{th}$ Street 420, and Bear Road 419 & 422. Using the map data as the current datum, it is necessary to "snap" the location update information to the most likely road position on the map data that a location update point actually represents. This is a moot point if, for example, the location update information is accompanied with other location-relevant information, such as an address. If this is the case, then the point on the street can be GEO-Coded, which allows the address information to be compared against an additional file, typically contained in the map data, where the file provides the latitude and longitude position of the device in the map data, such as on 9$^{th}$ Street 416. GEO-Coding is a term widely known to people skilled in the art.

If location update information (i.e., latitude, longitude, altitude, etc.) is the only information provided, then the actual positions of the location updates on the map data roads must be determined. For example, Point-1 404 appears to be either on 9$^{th}$ Street 416 or Bear Road 422. The preferred method used to calculate the most probable map data point for Point-1 404, considering the error probability of Point-1 404, would be the point on a road nearest to the location update point, as described by the following method: 1) Extend an error radius 408 that creates a circle 412 from the center of the location update 404; and 2) as the circle radius 408 is increased, determine the road segment from the map data that first intersects the newly created circle 412.

As shown in FIG. 4A, that point is illustrated 416 on 9$^{th}$ Street 421. As people skilled in the art will appreciate, this point 416 also has a street address, but it is omitted in this example. This same approach is applied to all location update points shown in FIG. 4A, such as Point-1 404, Point-2 403, Point-3 406, and Point-4 405. Each location update point is snapped-to the nearest road segment, such as 416, 415, 418, & 417, using the same circle test 412, 411, 414, & 413 and circle radius 408, 407, 410, & 409 illustrated in FIG. 4A.

Figure 5:
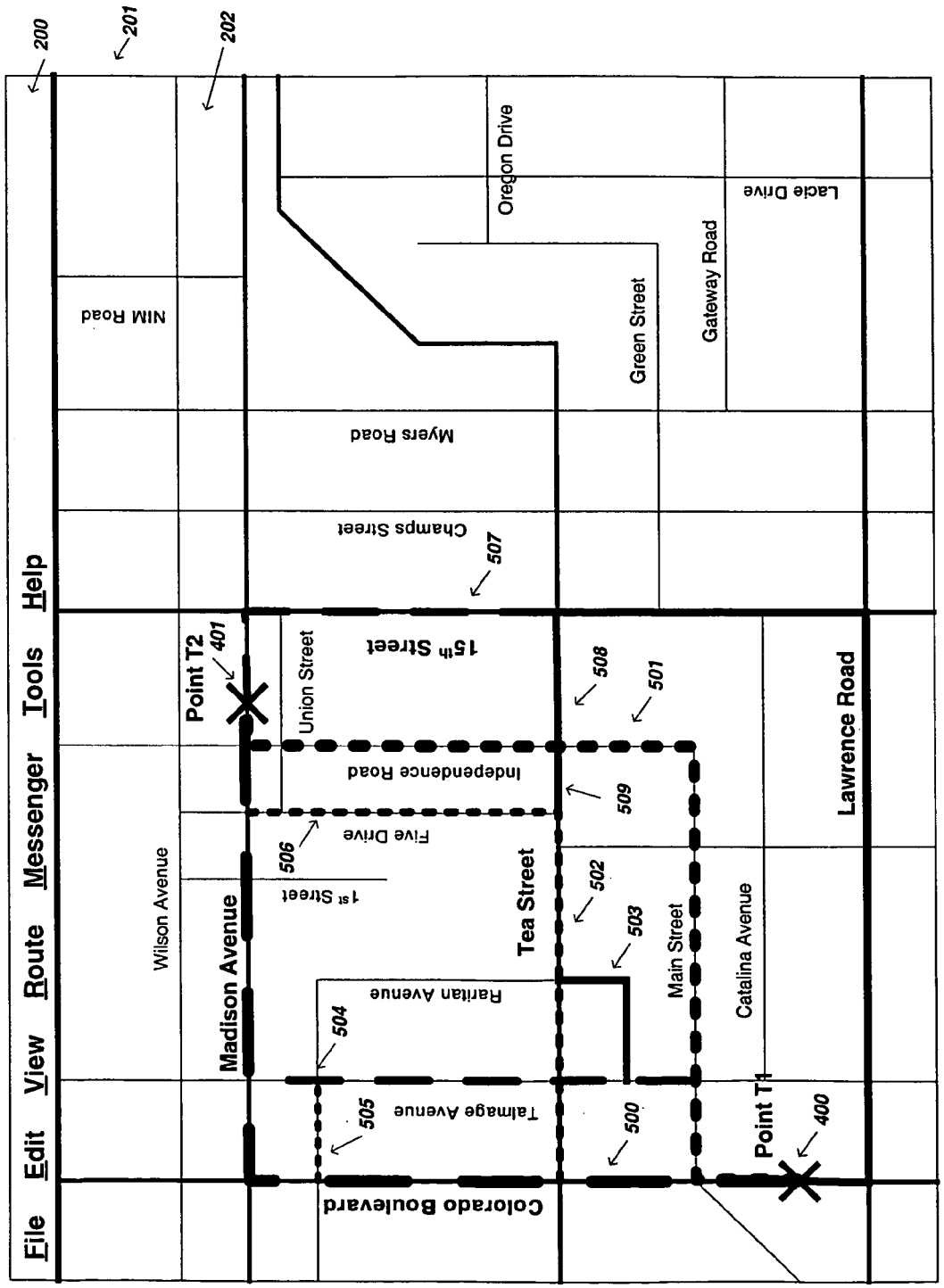
FIG. 5 illustrates another aspect of the present invention for graphically displaying various possible routes between two points in space that are correlated against map data.

As shown in FIG. 5, there are various pathways that can result from a route computation between Points T1 400 and T2 401, a subset of which are illustrated in FIG. 5. For instance, the possible routes from Point T1 400 and Point T2 illustrated include, but are not limited to 500, 501, 502, 503, 504, 505, 506, 507, 508, and 509. As an example, route 500 travels north on Colorado Boulevard 300 and then East on Madison Avenue 303 until Point T2 401 is reached. The estimated route, from Point T1 400 to Point T2 401, is based on various general route preferences, and can be greatly improved when the route preferences are tailored to the specific mobile device, such as in the case of a truck which would only be allowed to travel on major roads, while a car can transverse major and minor road networks. These route preferences can include various categories, such as Driving Speeds, Route Optimization Goal, Road Preferences, etc. For example, Driving Speeds illustrates various types of average speeds the specific motor vehicle travels over various type of roads, such as Interstate Highways Average Speed, Other Highways Average Speed, Arterial Roads Average Speed, Surface Streets Average Speed, or the like. In this embodiment, Route Optimization Goal represents either the Fastest Route or the Shortest Route, while Road Preferences illustrates whether the motor vehicle typically avoids Highways, Arterial Roads, or Toll Roads. These and other preferences allow the route estimation to more closely approximate the actual route most likely traveled by the motor vehicle when it provided the discrete location update information.

Figure 6:
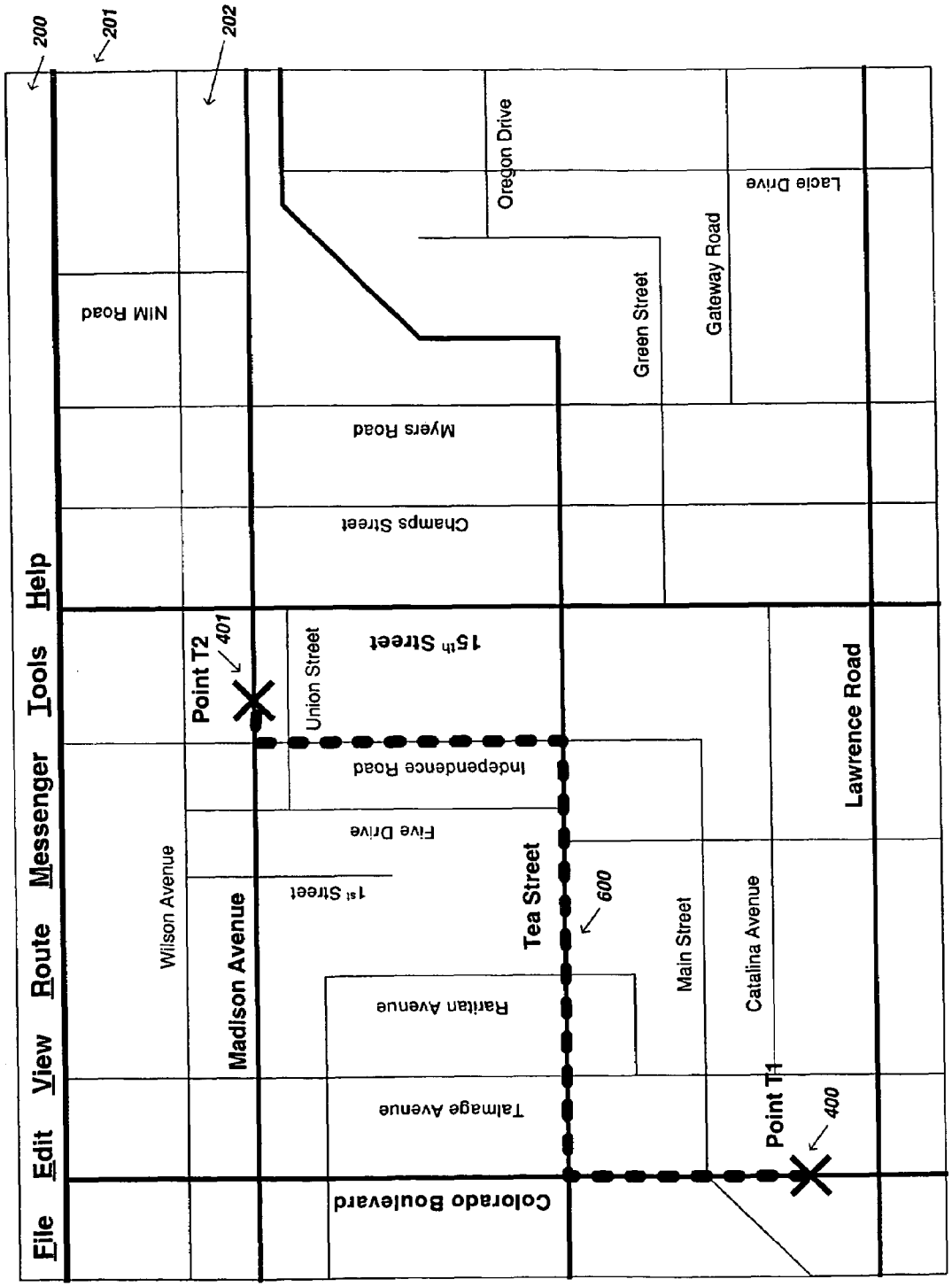
FIG. 6 illustrates another aspect of the present invention for providing the most accurate estimated route between two location update points in real-time using various route preferences.

Using the provided route preferences, the most probable route 600 that the mobile device traveled between Point T1 400 and Point T2 401 is illustrated in FIG. 6. This route includes the shortest distance and fastest time route between the two points. The route information includes driving directions, such as "North on Colorado Blvd for 0.2 miles, Right onto Tea Street heading East for 0.4 miles, Left onto Independence Road heading North for 0.35 miles, Right onto Madison Avenue heading East for 120 yards, Arrive at Destination". In this embodiment, this route is dynamically created upon the receipt of Point T2 401, given that Point T1 400 has already been received and displayed on the application.

Figure 7:
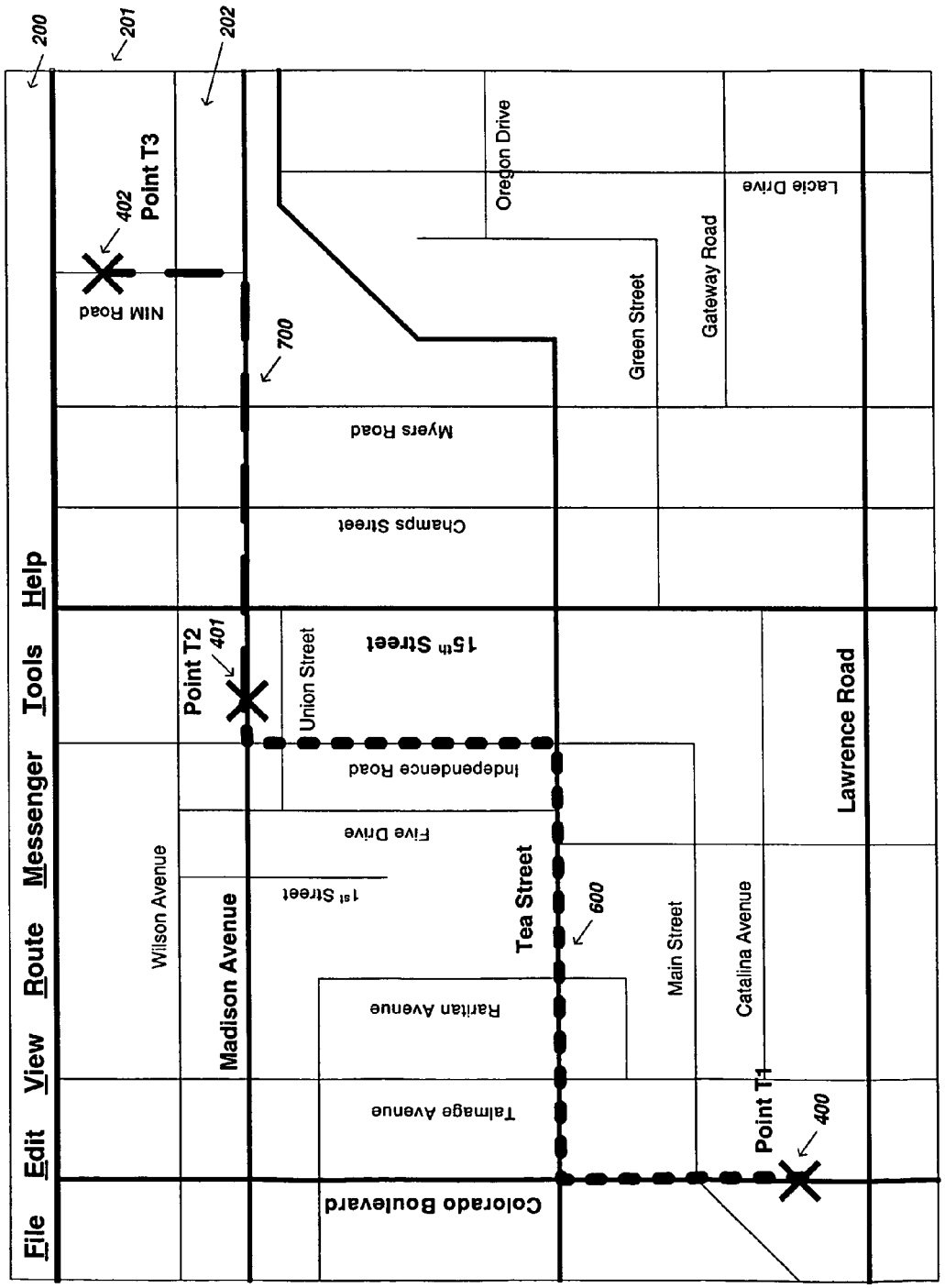
FIG. 7 illustrates another aspect of the present invention for providing an additional estimated route between two location update points in real-time.

The process is completed when Point T3 402 is received from the mobile device and a new route is estimated and displayed, as shown in FIG. 7. As people skilled in the art will appreciate, this process provides significantly more information to the user and application compared to having only the points displayed on the map, straight lines between the points, or arrows at the points indicating the heading of the device at that specific point.

Figure 8:
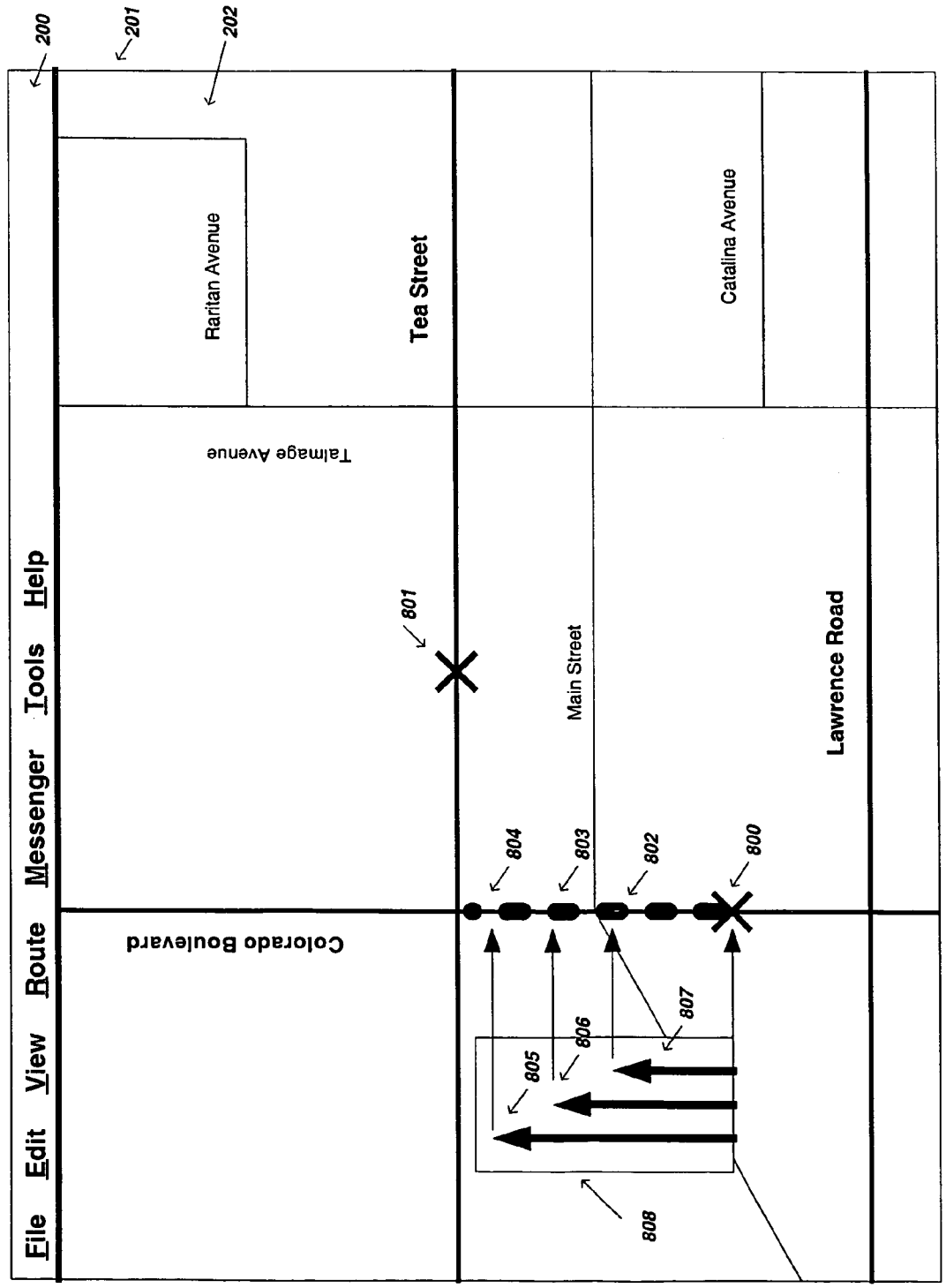
FIG. 8 illustrates another aspect of the present invention for graphically displaying the start of a predictive route calculation.

Also contained in this invention is the process of calculating predictive routes. An estimated route is computed upon the arrival of each location update, and at least 2 location updates are needed to compute an estimated route. A predictive route graphically illustrates the mobile device's location when a location update is received, and a predicted estimate of its current location, based on metrics such as speed, heading, etc., until the next location update arrives. In one embodiment, as shown in FIG. 8, if an origin point 800 and destination point 801 are known, and the origin update arrives at a given time, using either the road speed limit or the mobile device's typical speed (i.e., motor vehicle, bicycle, runner, etc.), a predictive route can be calculated. For example, given that point 800 is the starting point, and using the expected velocity and system time, it is possible to compute the average distance traveled as a factor of time (Distance=F(t) =Velocity*Time) and display that information without requiring the known or expected position of the next or destination point 801. At a time of 2 seconds later, a scalar distance 807 is computed and displayed as a highlighted partial route up to the point 802. At a time of 3 seconds later, a scalar distance 806 is computed and displayed as a highlighted partial route up to the point 803. At a time of 4 seconds later, a scalar distance 805 is computed and displayed as a highlighted partial route up to the point 804. This process is continued until a fork in the road is encountered. This is further illustrated by FIG. 9.

Figure 9:
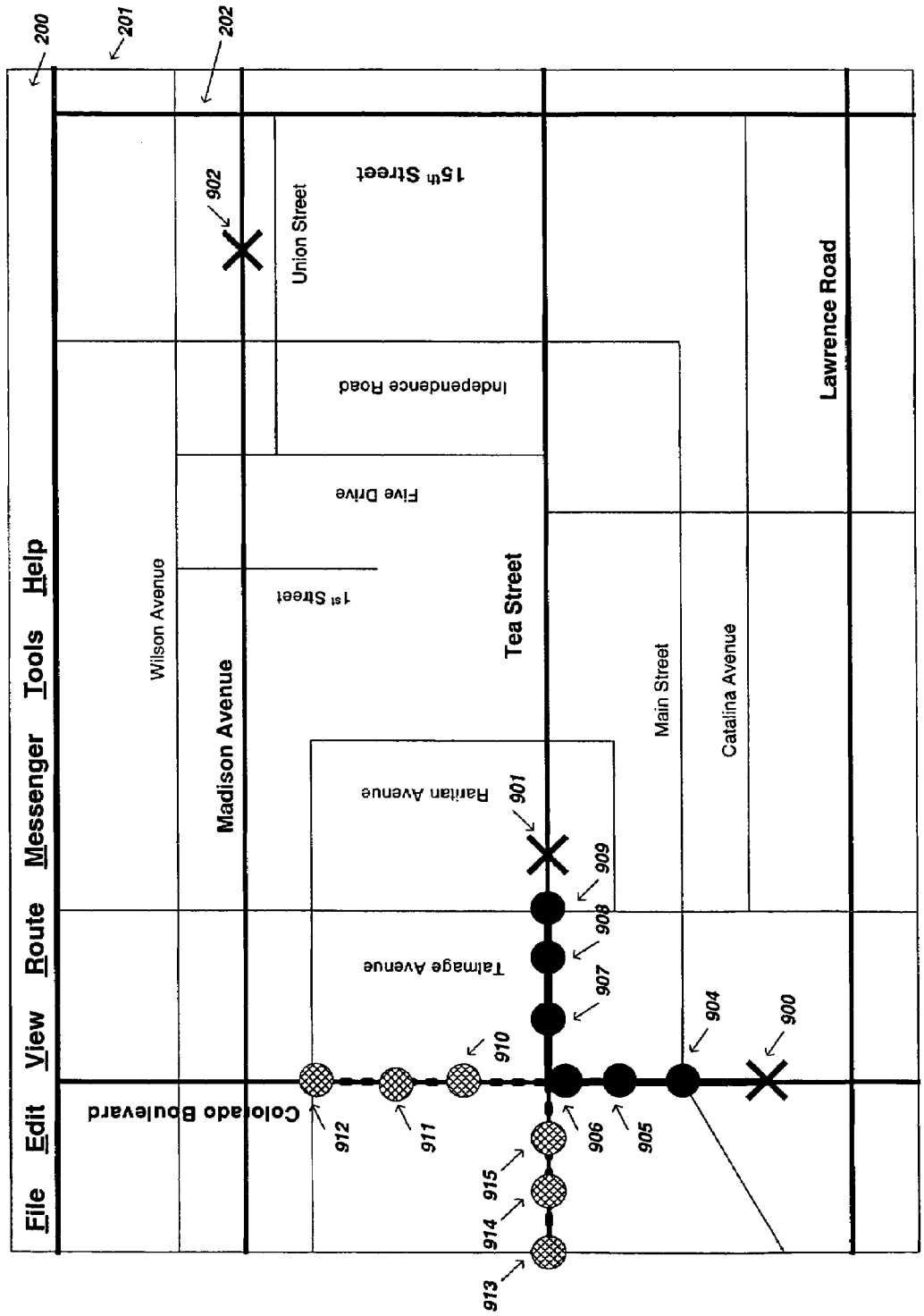
FIG. 9 illustrates yet another aspect of the present invention for graphically displaying all of the possible predictive route calculations at a fork or juncture of the map data.

In another example, once a fork in the road is encountered, as shown in FIG. 9, the previous points 900, 904, 905, 906 are already drawn. The possible pathways the vehicle can continue moving along are: 1). The same road (North), 2). Turn Left (West), or 3). Turn Right (East). If the system did not know a priori the destination point 902, then the predicted route would display all possible routes. For example, after point 906 is received from the mobile device, and 1 second later, routes to points 907, 910, and 915 would be calculated and displayed. At a time of 2 seconds later, routes to points 908, 911, and 914 would be drawn. At a time of 3 seconds later, routes to points 909, 912, and 913 would be calculated and displayed. In this embodiment, once the next location update 901 arrives, the other route legs that do not lead towards the new point 901 (i.e., 915, 914, 913, and 910, 911, and 912) would be erased and the route from point 900 to 901 would be displayed.

Figure 10:
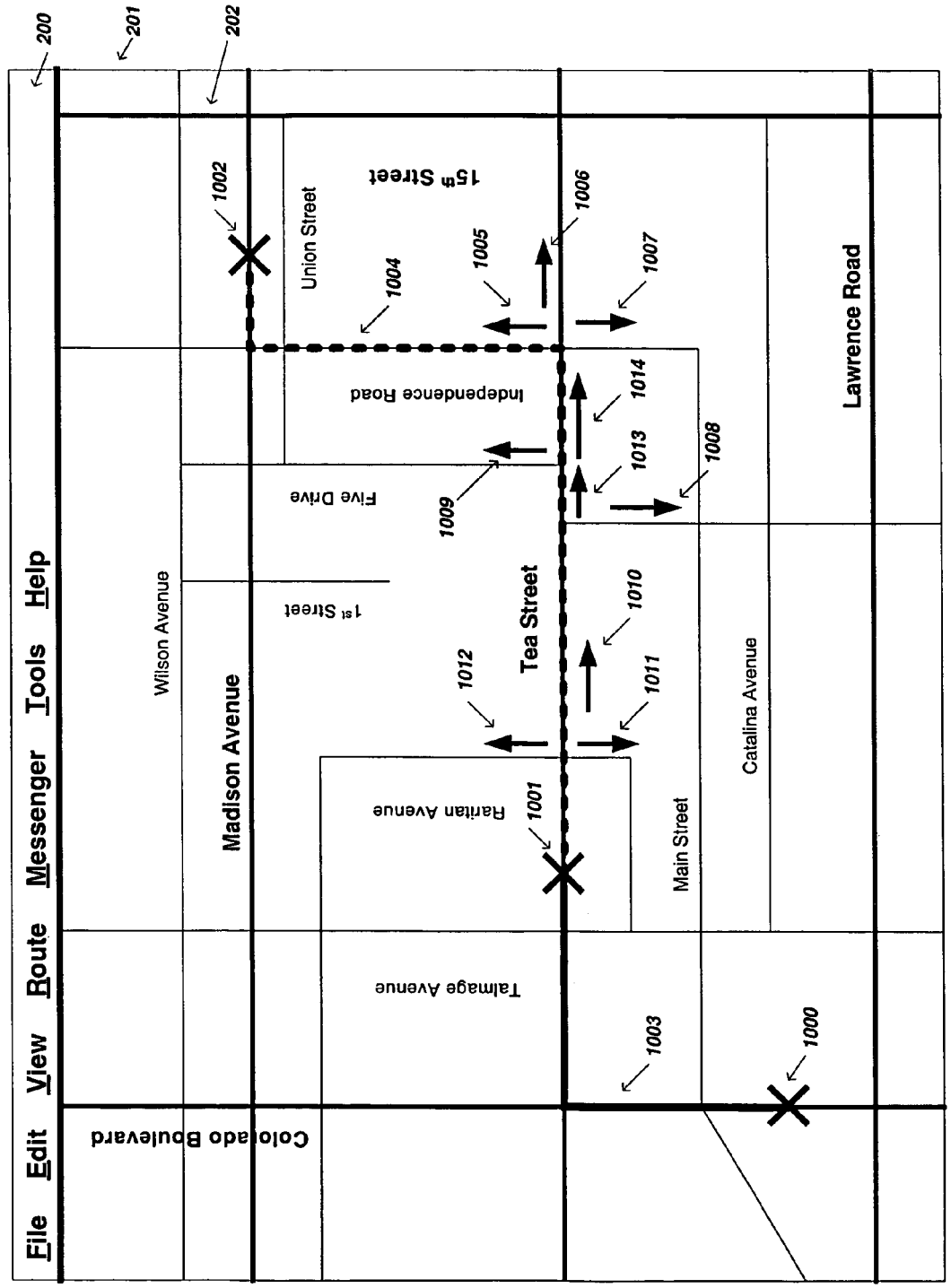
FIG. 10 illustrates yet another aspect of the present invention for graphically displaying all of the possible predictive route calculations between an origin point and a destination point along a route resulting from a set of route preferences.

As illustrated in FIG. 10, this same process would be completed for all known forks in the road. For example, having the route 1003 drawn from point 1000 to 1001 and continuing at various time intervals based on the expected speed of the mobile device, all possible forks 1012, 1010, 1011, 1013, 1008, 1009, 1014, 1007, 1006, 1005 can be drawn until the next location update is provided 1002. Using the last known position 1001 with the expected destination 1002 to calculate the best estimated route between the 2 points can narrow down the possible routes and further mitigate excessive drawing.

Figure 11:
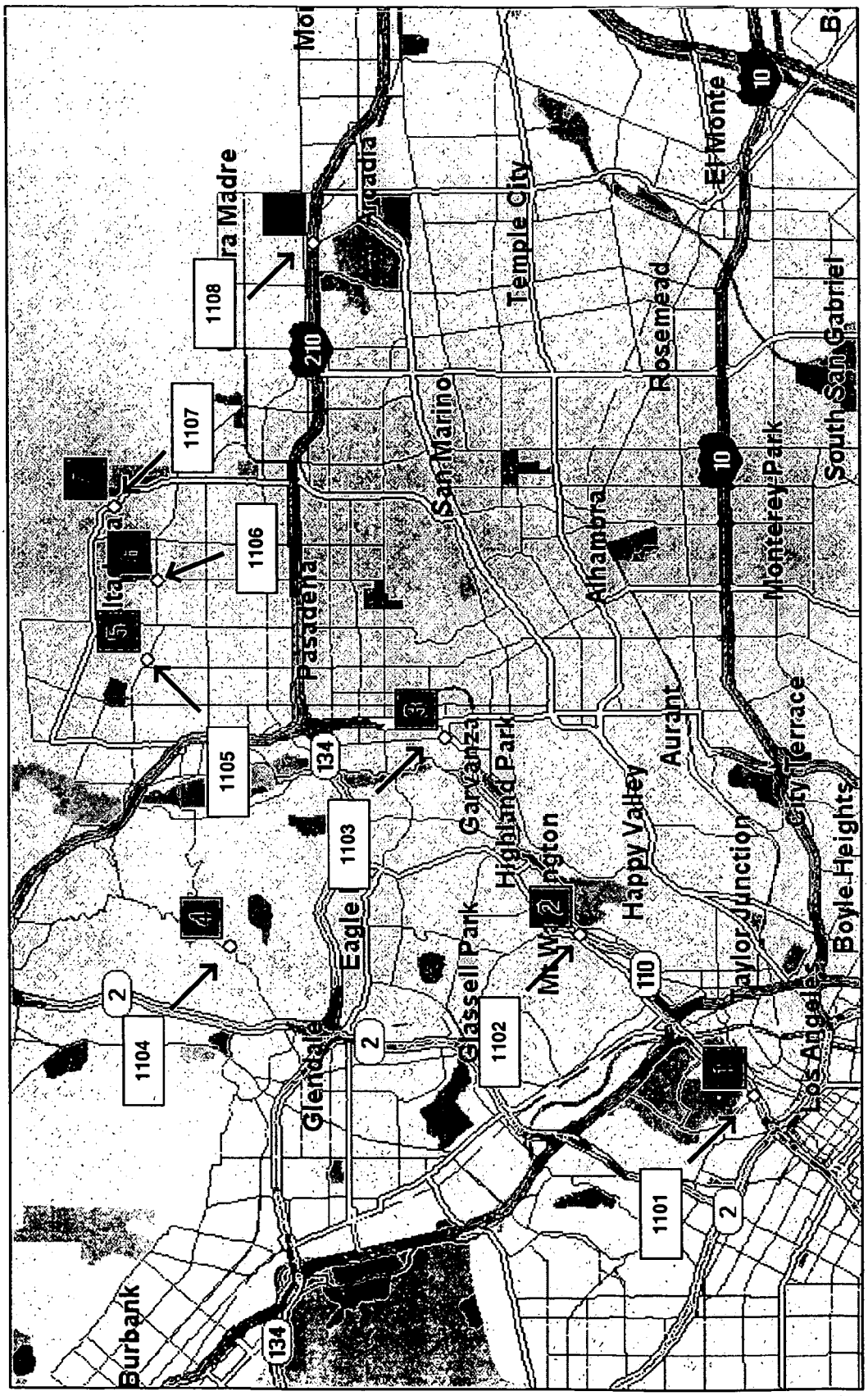
FIG. 11 illustrates yet another aspect of the present invention for graphically displaying a prior art location history trail of location points on a map display.

Illustrating a breadcrumb history with only points and/or direct lines has significant limitations. As people skilled in the art will appreciate, computing a dynamic estimated route, based on various route preferences, provides a significant benefit over prior art. FIG. 11 illustrates a typical breadcrumb history trail. The trail consists of points 1101, 1102, 1103, 1104, 1105, 1106, 1107, and 1108, all in chronological order of the mobile devices path. The problem is that the user does not know looking at this location history information where the device actually traveled. Since the location history information is discrete in nature, it is impossible to derive the actual route traveled by the mobile device without additional information and/or providing location history information at a significantly higher frequency.

Figure 12:
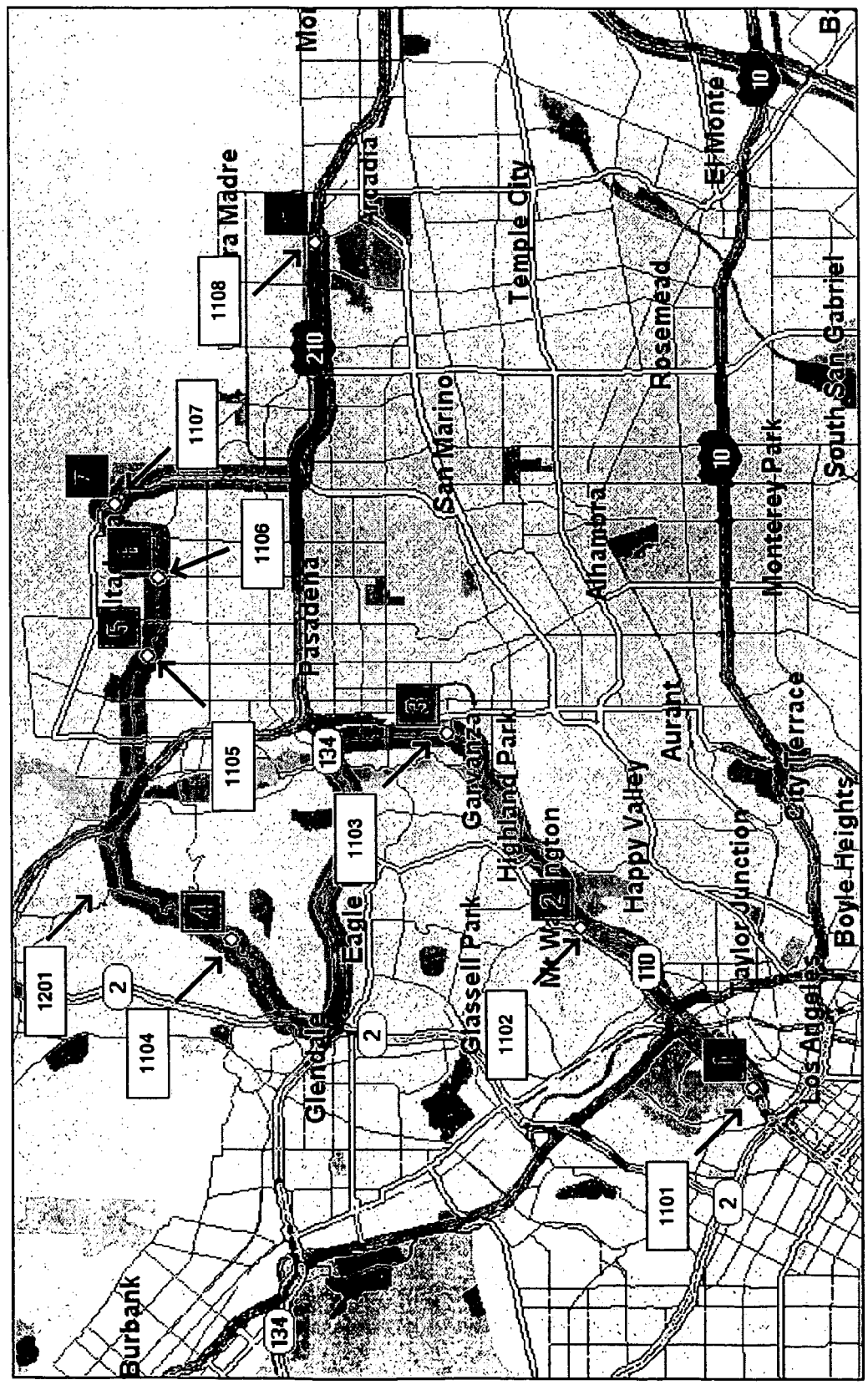
FIG. 12 illustrates yet another aspect of the present invention for graphically displaying the estimated route based on a set of location history points.

Calculating an estimated route 1201, as illustrated in FIG. 12, provides the breadcrumb history trail with significantly more visual information and metric information, such as total driving distance, or the like. The estimated route provides a much closer approximation to the actual driven route that the mobile device traveled. The estimated route calculation can be tailored using extensive route (e.g., driving) preferences that are specific to the mobile device.

Figure 13:
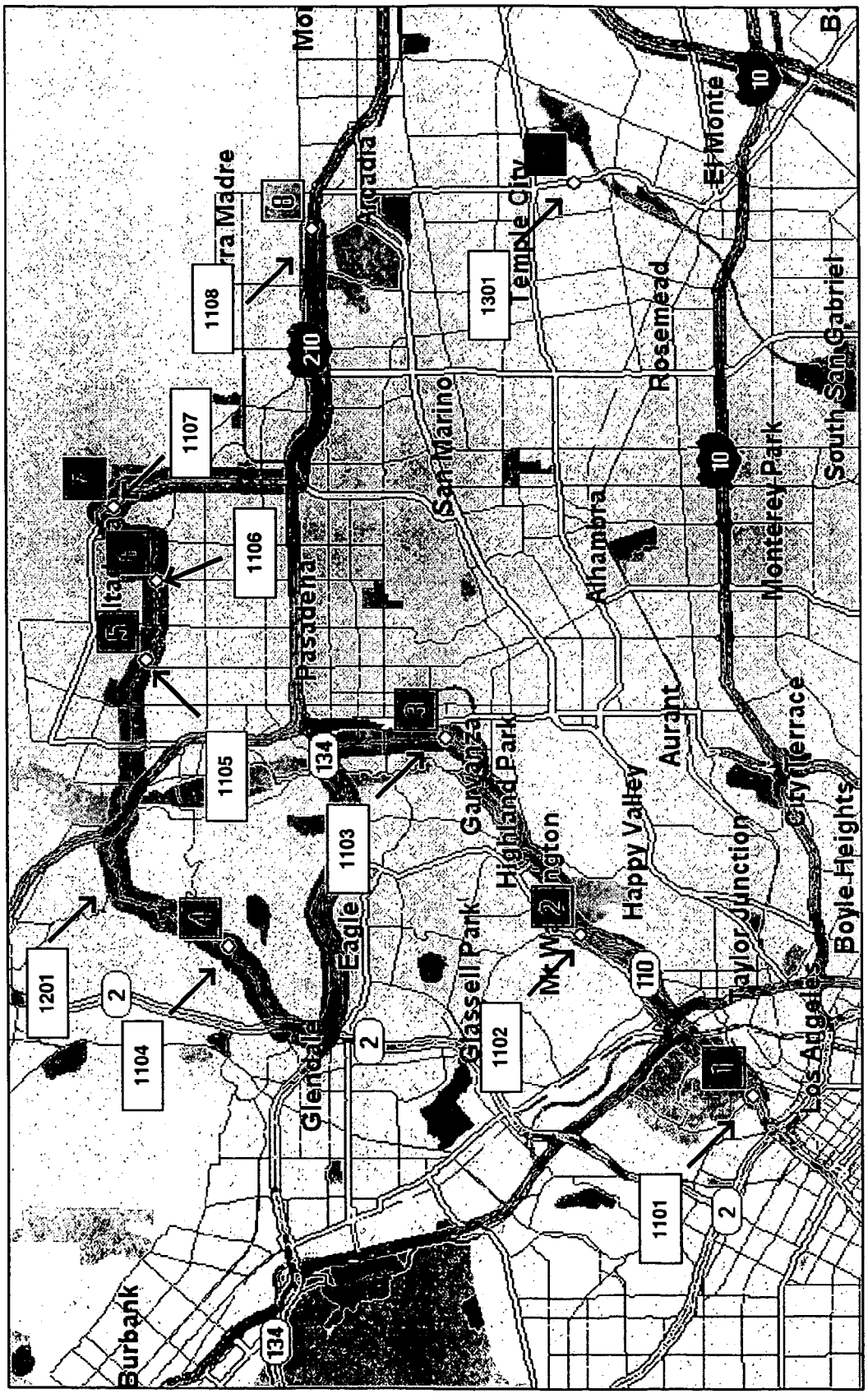
FIG. 13 illustrates yet another aspect of the present invention for graphically displaying a real-time location update point in addition to the previous estimated route calculation.

FIG. 13 illustrates a new location update 1301 which arrives in real-time and is displayed on the map display.

Figure 14:
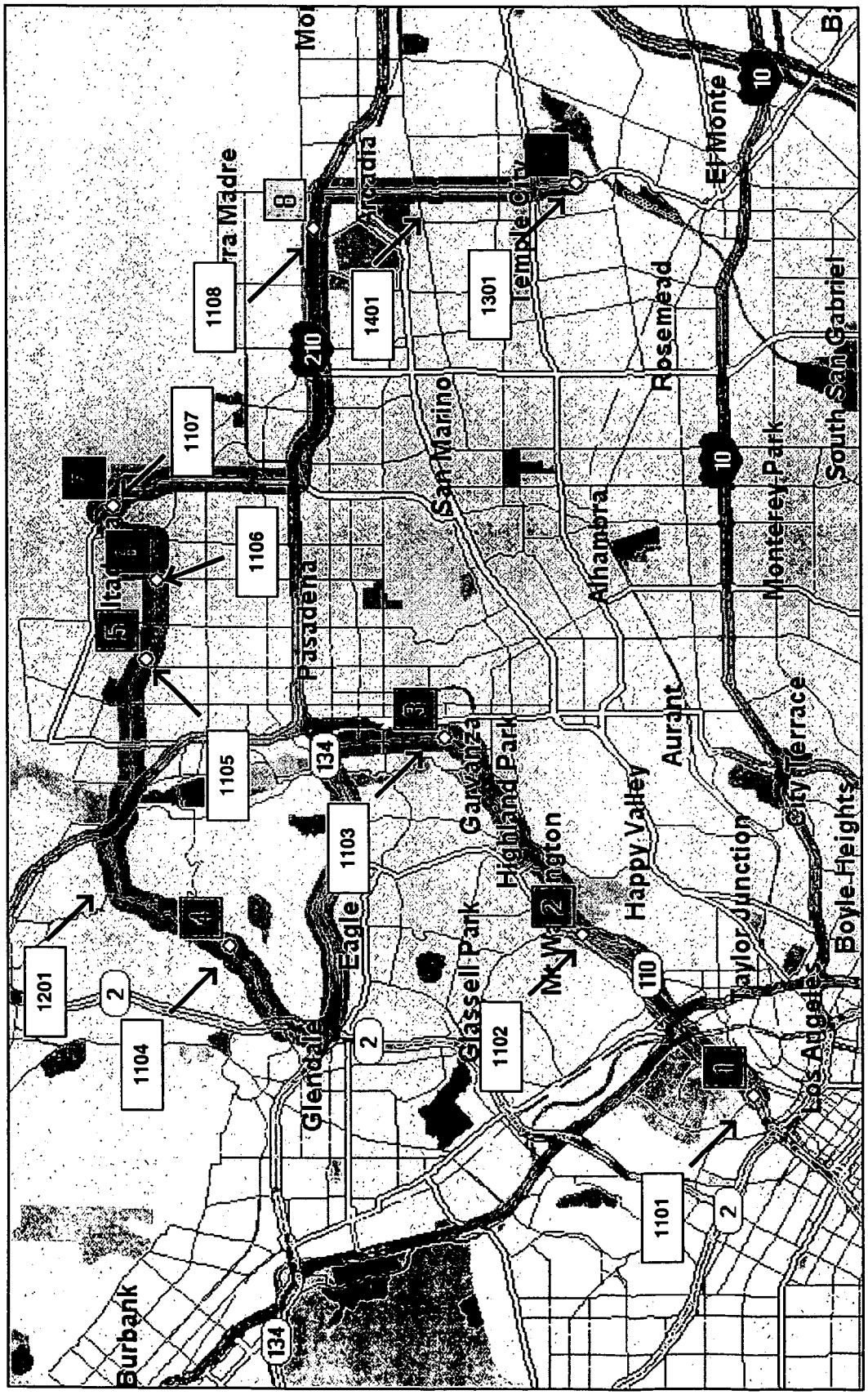
FIG. 14 illustrates yet another aspect of the present invention for graphically displaying a real-time route calculation based on tracking the mobile device that is periodically sending its location updates.

FIG. 14 illustrates the new estimated route leg 1401 calculated between Point-8 1108 and Point-9 1301. As people skilled in the art will appreciate, it is not necessary to compute an entire new route for the entire breadcrumb trail, but only the portion of the estimated route that needs to be calculated. As shown in FIG. 14, the original estimated route 1201 does not need to be recalculated, but only the new additional estimated route segment 1401 needs to be calculated.

Figure 15:
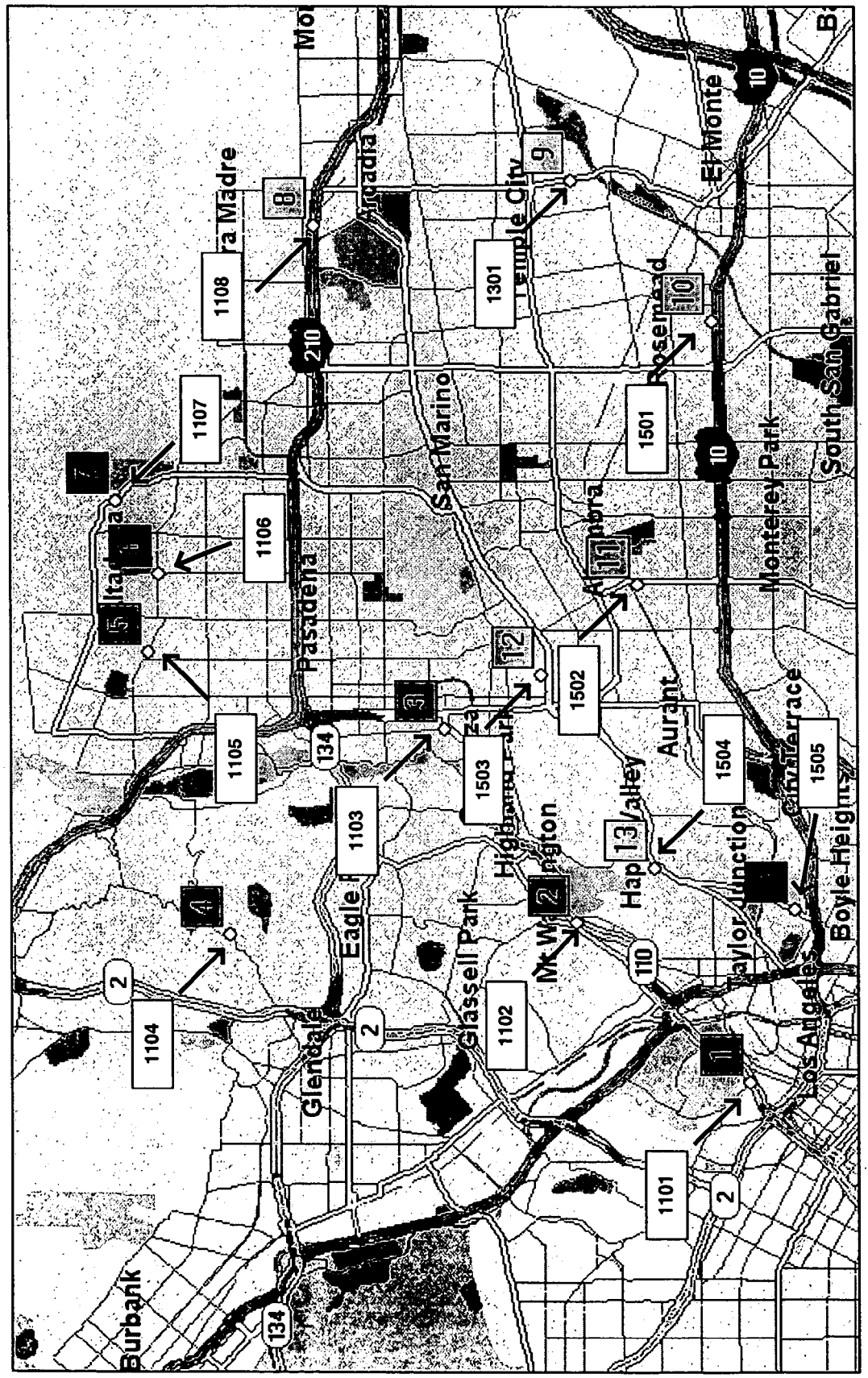
FIG. 15 illustrates yet another aspect of the present invention for graphically displaying the entire location history trail in addition to the real-time tracked location updates.
Figure 16:
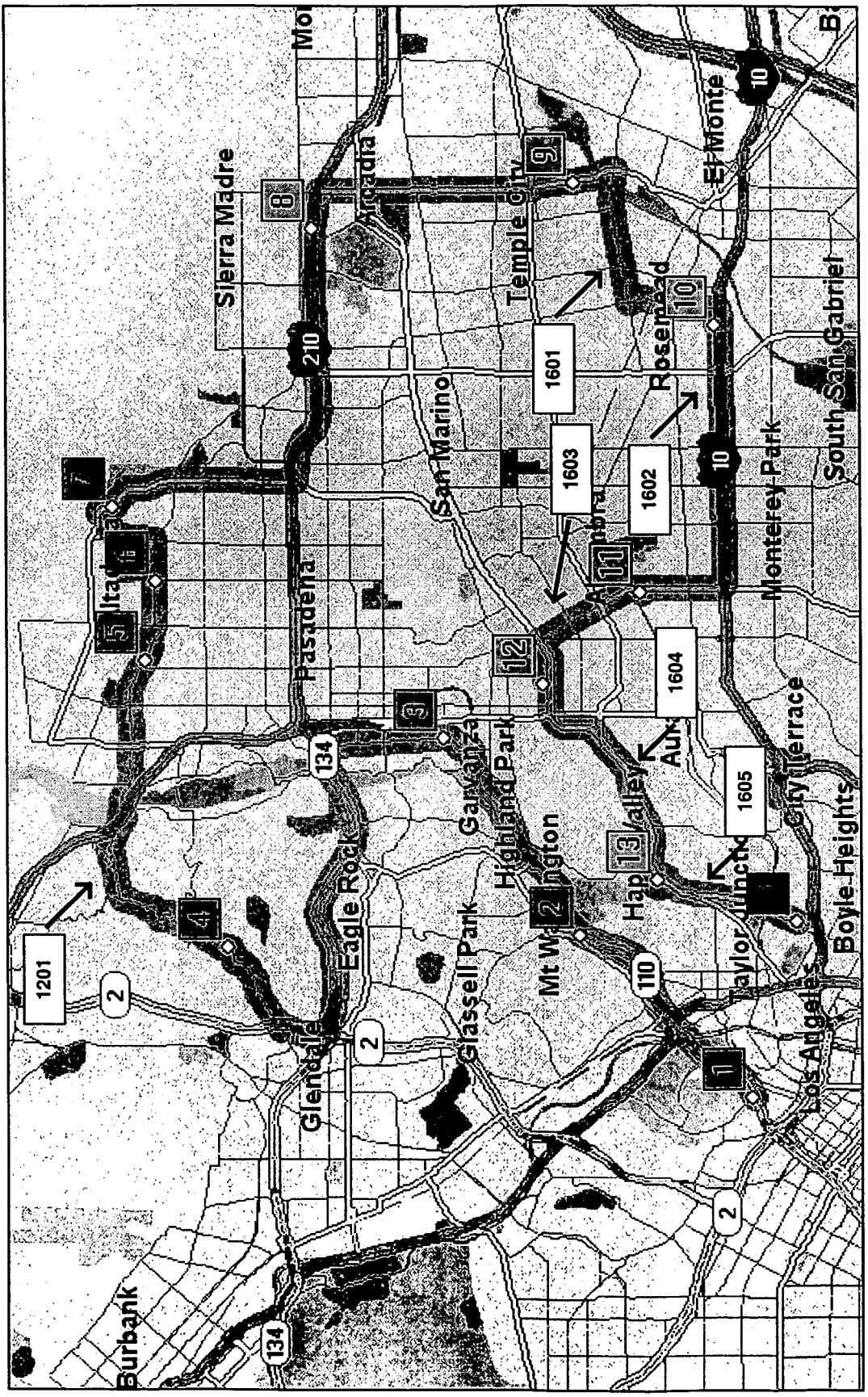
FIG. 16 illustrates yet another aspect of the present invention for graphically displaying an entire estimated route specifically illustrating the updated real-time estimated route calculations for the most recent location update points.
Figure 17:
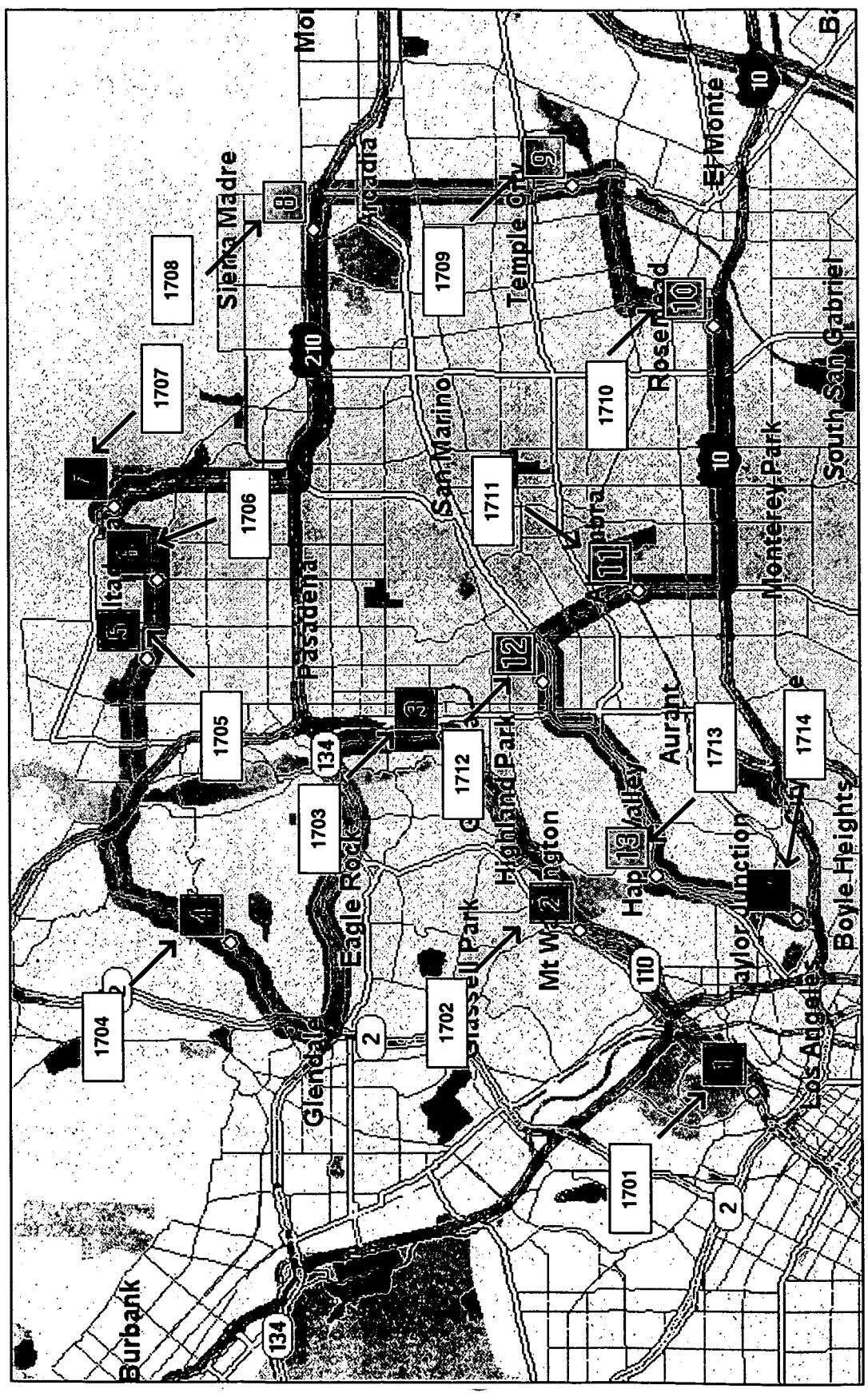
FIG. 17 illustrates still another aspect of the present invention for graphically displaying the entire estimated route based on a set of location history points.

The present invention can also allow a user to pull the entire location history information from a server or the mobile device in a number of ways, such as wirelessly, over the Internet, through a floppy disk, etc. As shown in FIG. 15, the entire location history trail was pulled from a server. The trail includes the previously noted points 1101, 1102, 1103, 1104, 1105, 1106, 1107, 1301, as well as the new additional points 1501, 1502, 1503, 1504, and 1505 that are added in real-time from the mobile device. These location history points are preferably numbered in their chronological order according to the time that the mobile device recorded them. As illustrated in FIG. 16, an estimated route 1201 is preferably displayed for the previous location history points, and the newly updated real-time estimated routes are preferably displayed as each new location update arrives, either via a server (P2S-S2P) or directly from the device (P2P). The new estimated routes, calculated in real-time as the location updates arrive to the application, are illustrated as 1601, 1602, 1603, 1604, and 1605. Shown in FIG. 17 are the entire location history trail points as they were captured from the mobile device. Each one of these points 1701, 1702, 1703, 1704, 1705, 1706, 1707, 1708, 1709, 1710, 1711, 1712, 1713, and 1714 are considered "via" points (i.e., a pass through point).

Figure 18:
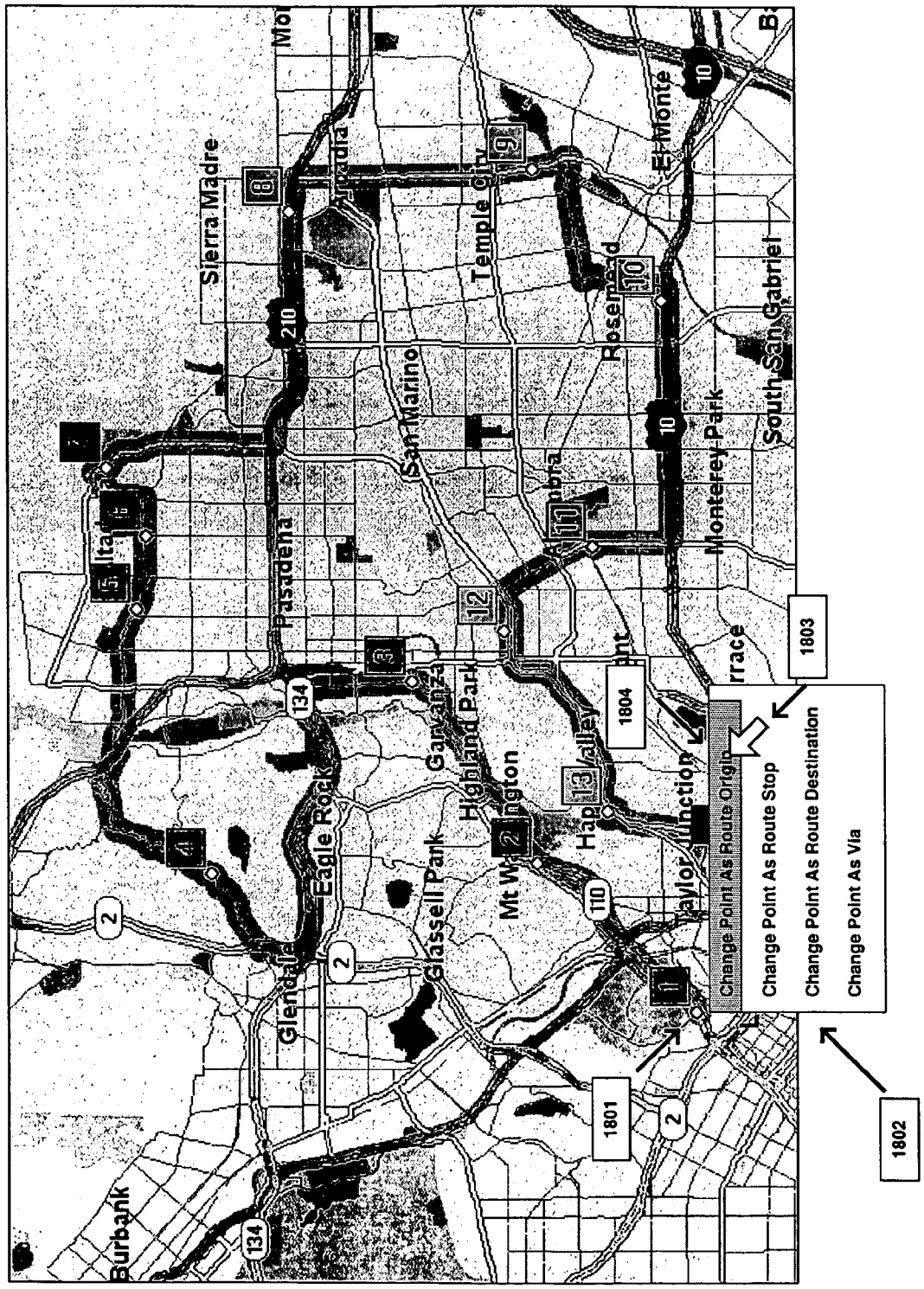
FIG. 18 illustrates still another aspect of the present invention for graphically changing a location update point to a Route Origin point.

Another embodiment of the present invention also allows the capability to change the individual location update points, such as in a route planner or directly on the map display. As illustrated in FIG. 18, using an icon pointer 1803 and selecting the desired point 1801, it is possible to change the point 1801 to a different type of destination point, such as an origin, via, stop, or destination point (by default, all points are vias). For example, selecting the desired location point 1801 using the icon pointer 1803 and selecting the focus on the map of the desired location point 1801, a pop-up window 1802 will open illustrating the various destination point types that the current location point type can be changed to. Using the icon pointer 1803 and selecting 1804 the desired destination type, in this case a route origin, it is possible to change the route point attributes.

Figure 19:
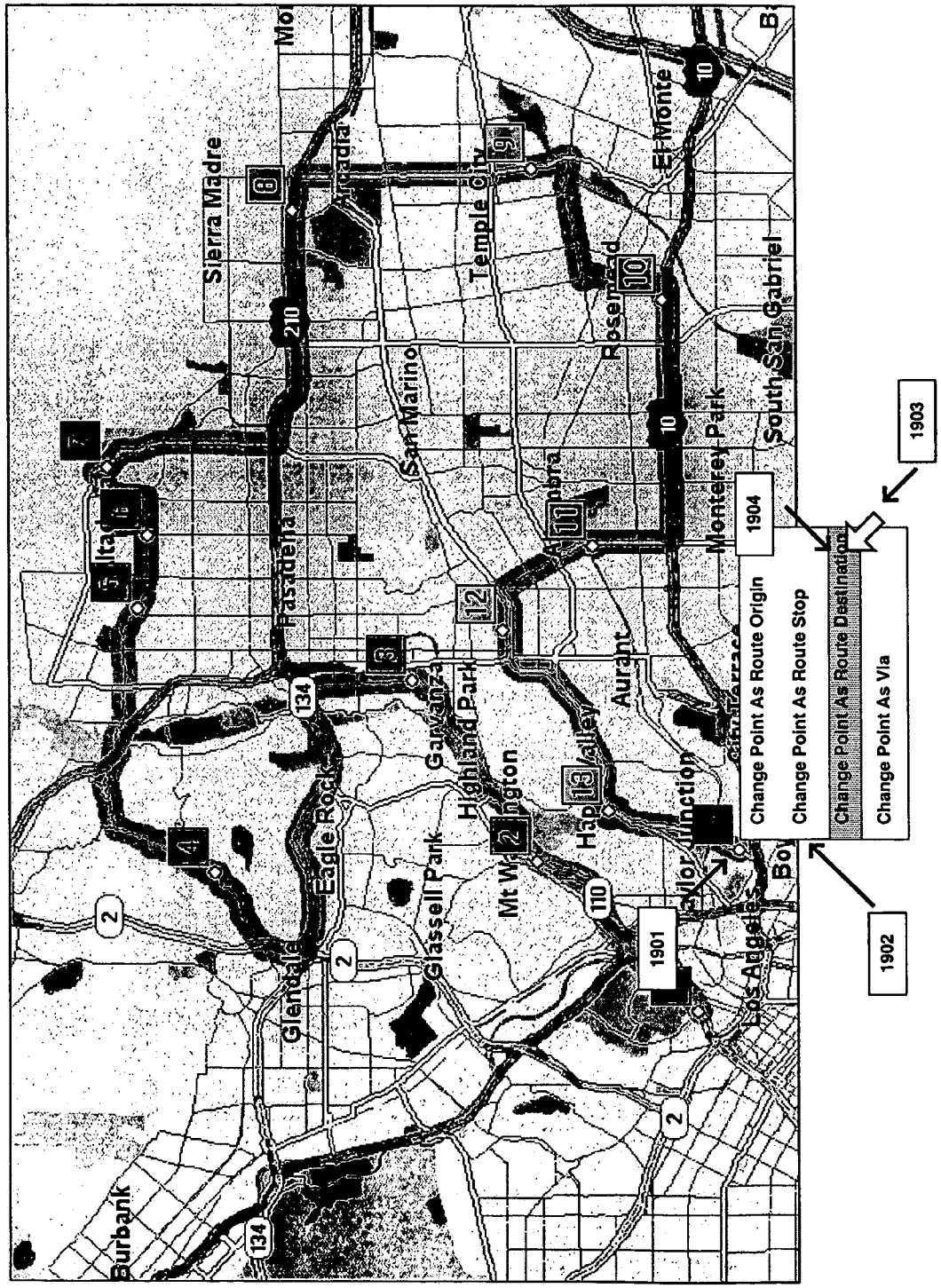
FIG. 19 illustrates still another aspect of the present invention for graphically changing a location update point to a Route Destination point.
Figure 20:
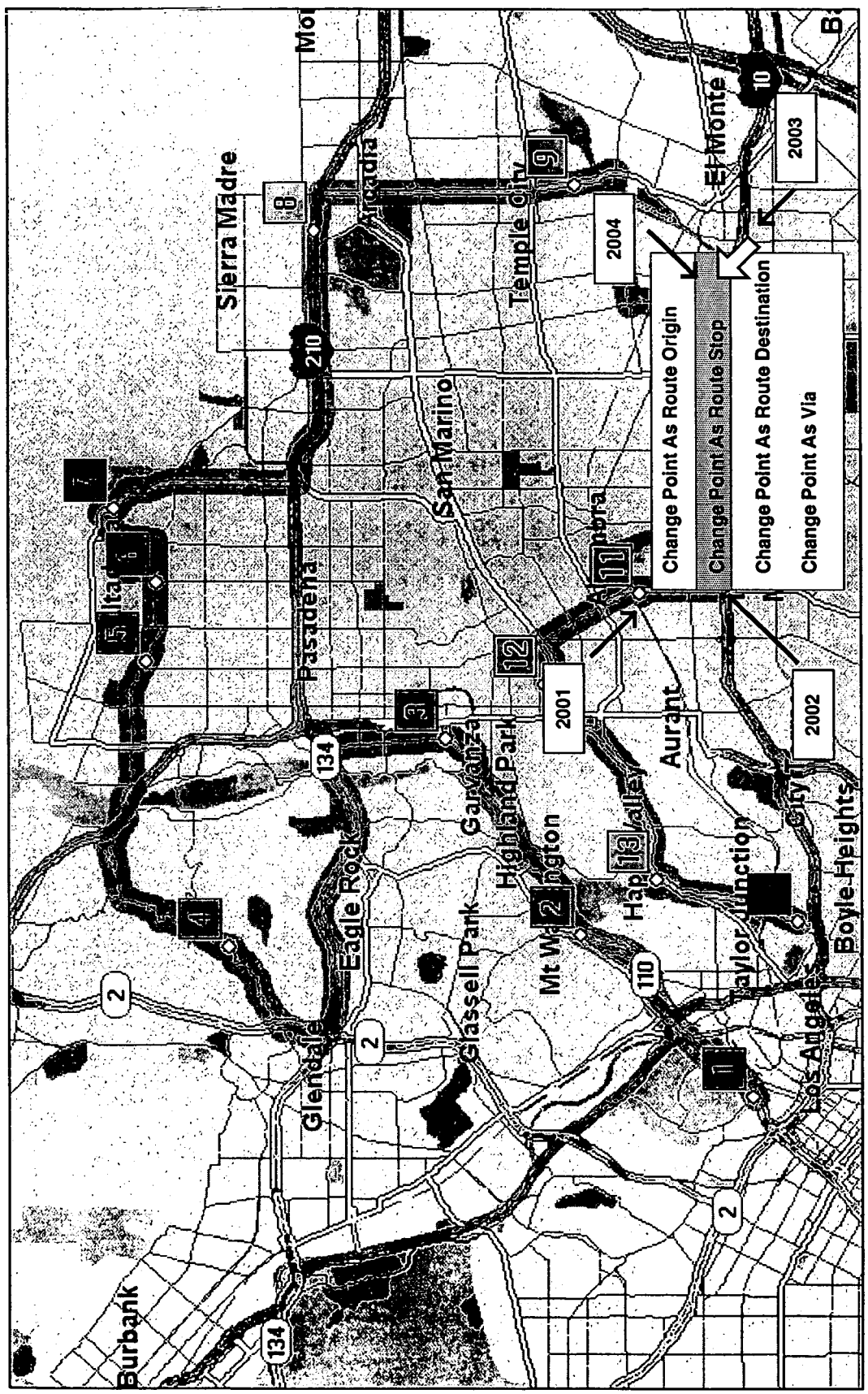
FIG. 20 illustrates still another aspect of the present invention for graphically changing a location update point to a Route Stop point.
Figure 21:
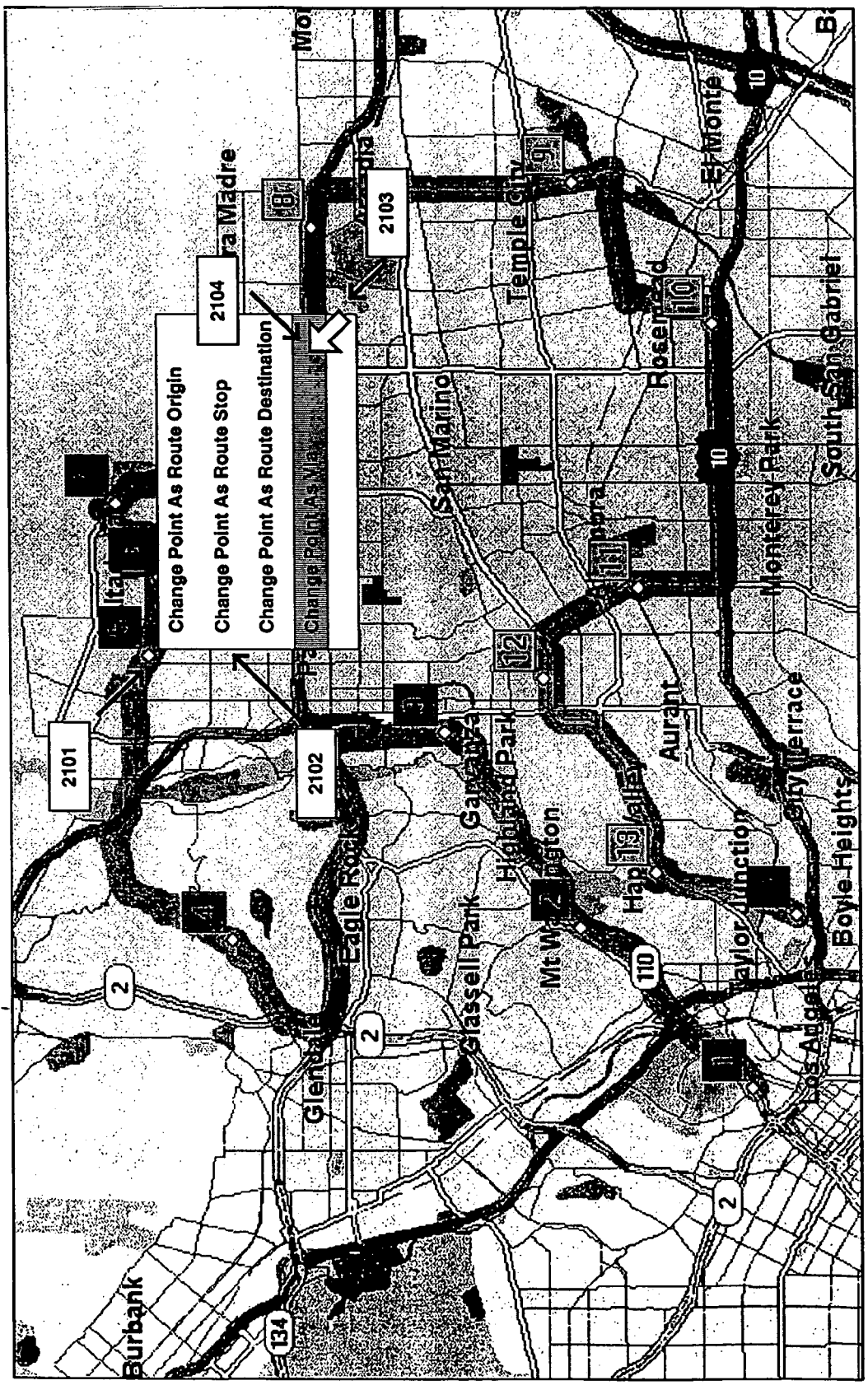
FIG. 21 illustrates still another aspect of the present invention for graphically changing a location update point to a Route Via point.
Figure 22:
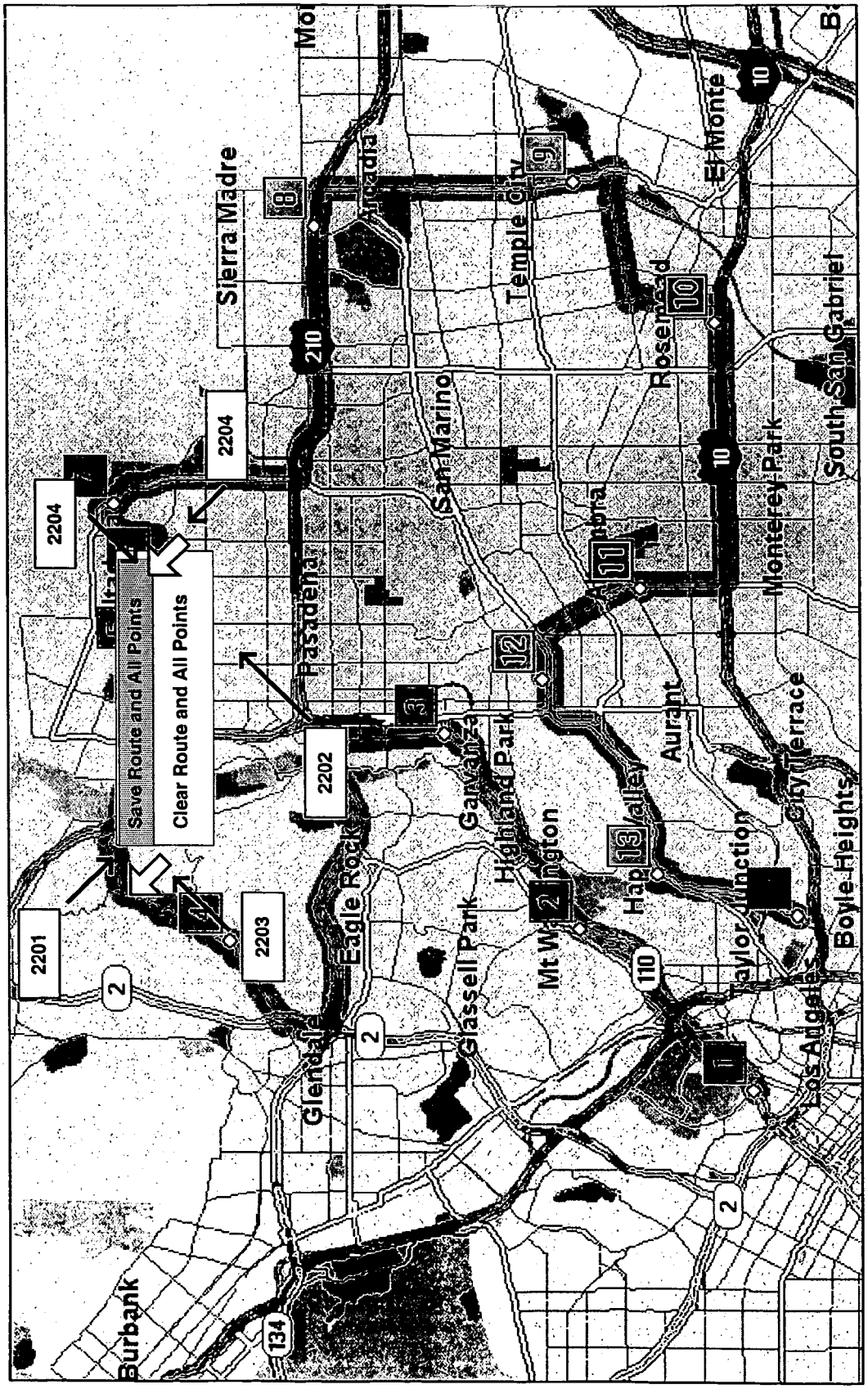
FIG. 22 illustrates still another aspect of the present invention for graphically saving an estimated route to a route planner and illustrating the capability to clear the current estimated route and location points.

As illustrated in FIG. 19, the route Point-14 1901 can be selected using an icon pointer causing a pop-up window 1902 to appear. The selected 1904 destination point is changed using the icon pointer 1903 to the desired type, a route destination. As illustrated in FIG. 20, the route Point-11 2001 can also be selected using an icon pointer causing a pop-up window 2002 to appear. The selected 2004 destination point is changed using the icon pointer 2003 to select the desired type, a route stop. In FIG. 21, the route Point-5 2101 is again selected using an icon pointer 2003 causing a pop-up window 2102 to appear. The selected 2103 destination point is changed using the icon pointer 2103 to select the desired type, a route via.

It should be noted that the entire estimated route could be saved or cleared. In one embodiment, illustrated in FIG. 22, selecting the entire route 2201 with the icon pointer 2203 causes a pop-up window 2202 to appear where the desired action can be selected 2204 using the icon pointer 2204. Additionally, as people skilled in the art will appreciate, individual points can be modified, moved or deleted, and new points can be added to the route. This is possible by adding the highlighted estimated route or location history points into a route planner where all of these modifications can be implemented either in the planner or on the map display.

Figure 23:
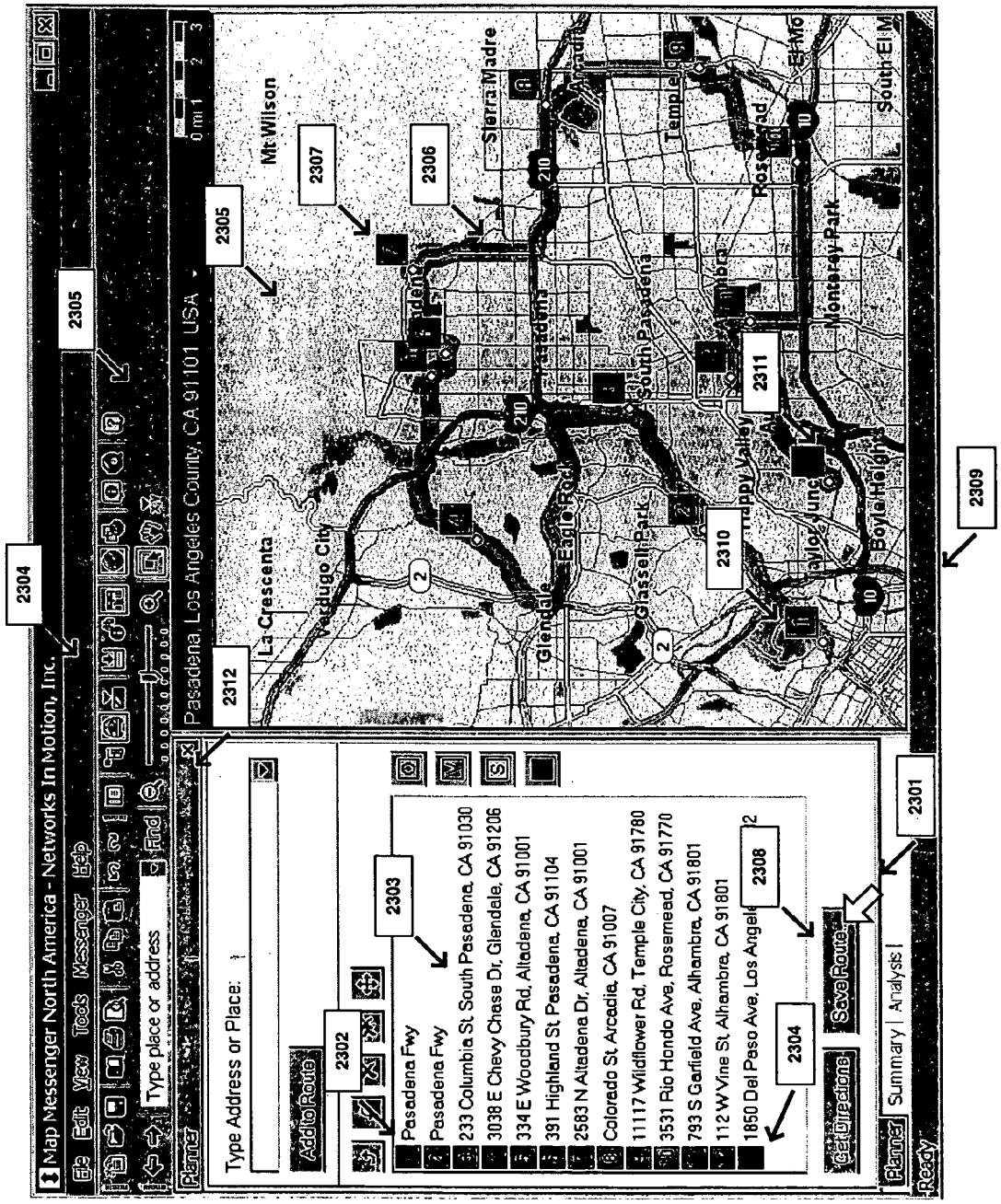
FIG. 23 illustrates still another aspect of the present invention for graphically displaying the location update points added to a route planner window for modifying and/or saving the estimated route.

Illustrated in FIG. 23 is the Map Messenger™ program 2309. The program 2309 contains a menu bar 2304, a tool bar 2305, a map display 2305, and a route planner window 2301. The location history trail with its estimated route 2306 calculated using the aforementioned method and system consists of 14 route points. After adding the points to the route planner window 2301, in this embodiment, the first 2310 and last 2311 points of the estimated route 2306 are changed to an origin 2302 and destination 2304 route point, respectively. Each of the other individual route points 2307 are also added to the route planner window 2301, and in the same order are displayed on the map display 2305. The route planner window 2301 illustrates all of the location points and the addresses 2303 of the location points. Using the route planner window 2301, it is possible to modify the route completely by adding points, deleting points, moving points, or the like. As people skilled in the art will appreciate, the route planner window 2310 gives the user complete control over the location history trail and estimated route 2306, in the event that they want to modify it at anytime. Also illustrated in FIG. 23, is the capability to save a route 2308. After a route is in the route planner window 2301, all of the specific information can be saved, either locally or on the server system 125.

Figure 24:
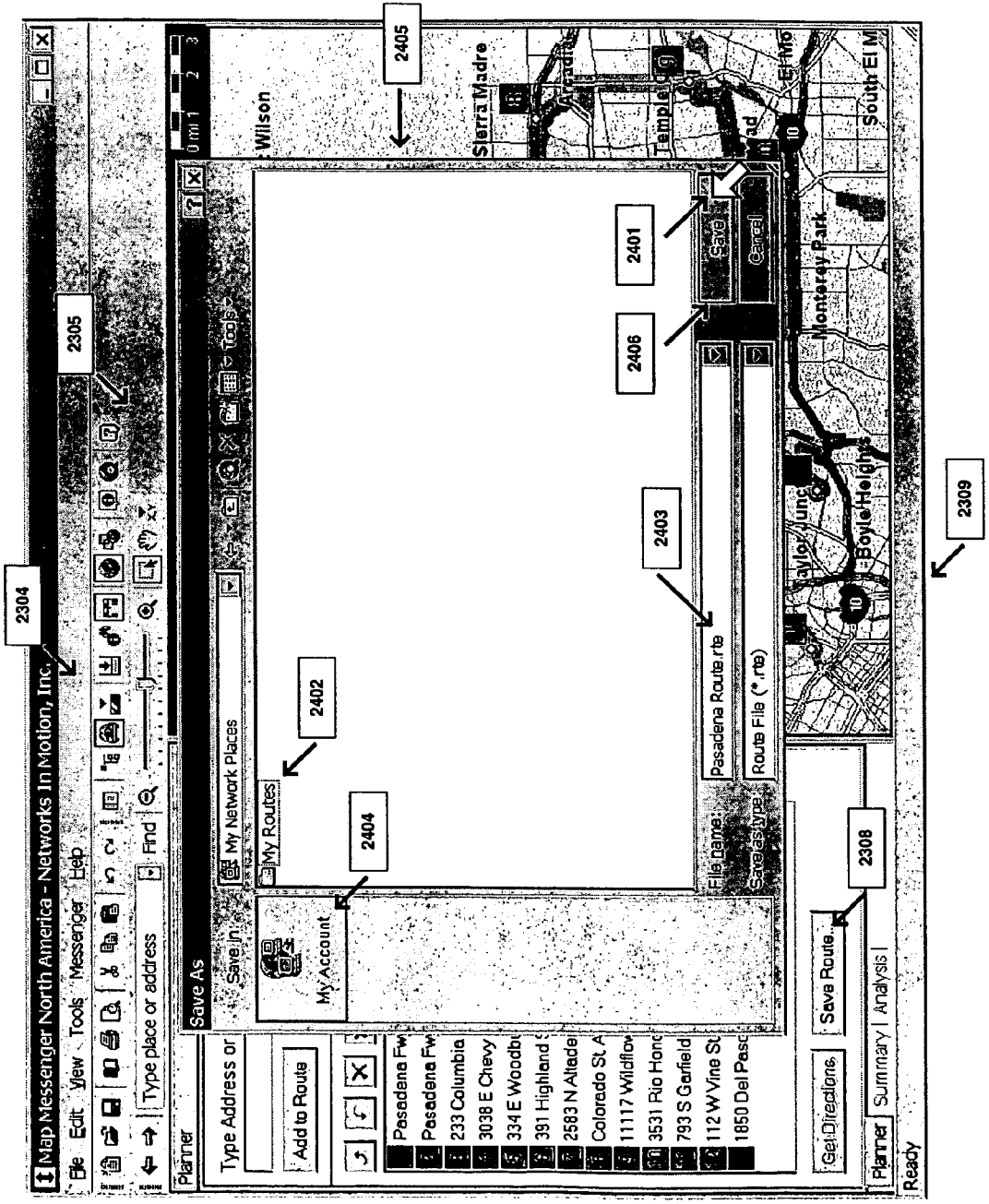
FIG. 24 illustrates still another aspect of the present invention for graphically saving a calculated route after it has been added to the route planner window.

FIG. 24 illustrates the window 2405 for saving a route, which includes a place to enter a file name 2403 and a mechanism for selecting the directory 2402 to save the route within and the account 2404 to save the route to. To save the final route, the icon pointer 2401 is preferably used to select the save button 2406. The route is then stored either locally or on the server system 125, which is then available for later retrieval.

Figure 25:
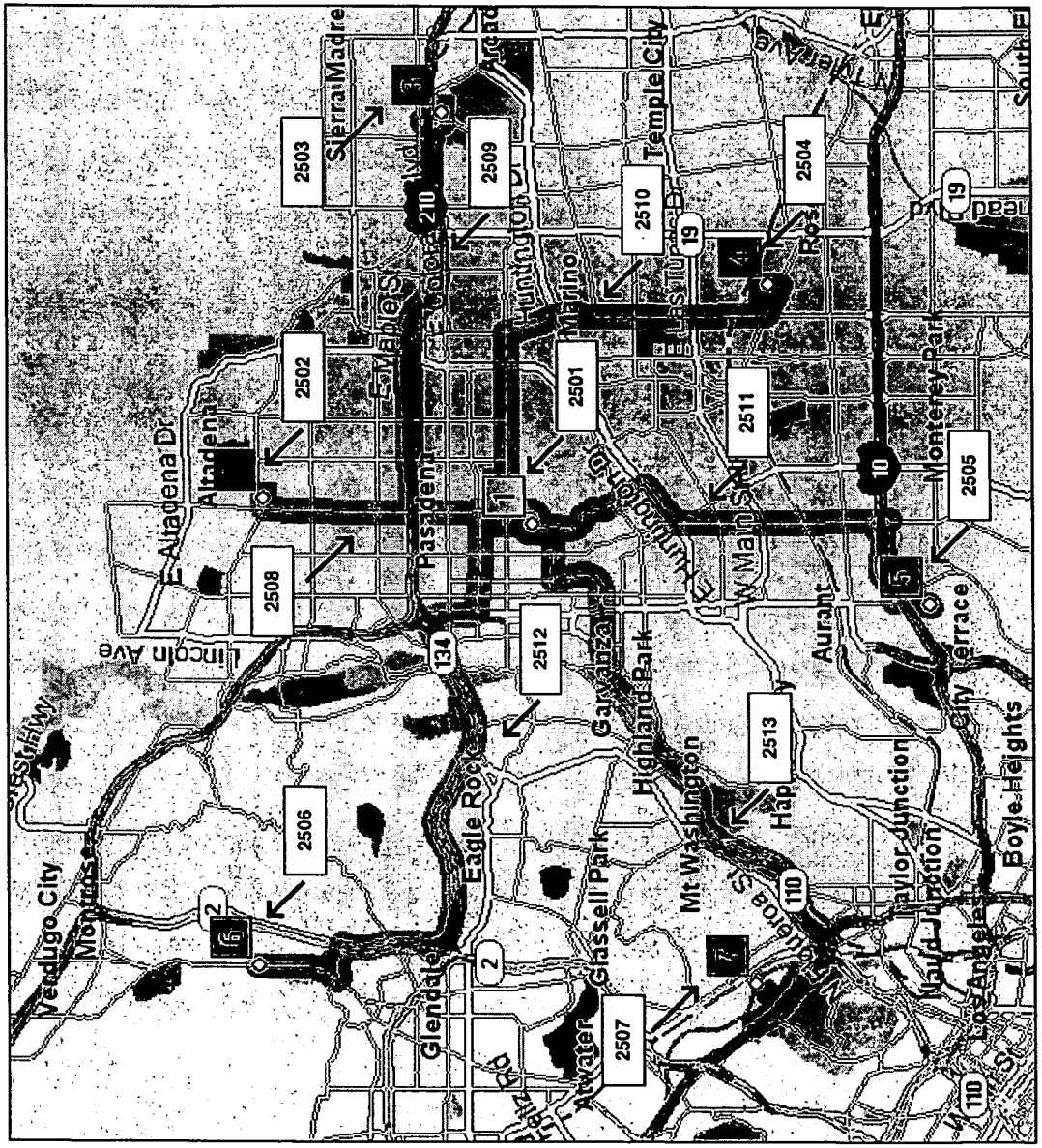
FIG. 25 illustrates still another aspect of the present invention for graphically displaying the estimated route calculations from various mobile devices to a centralized stationary position or other mobile device.

In another embodiment, a user wishing to calculate which mobile device is closest to a particular single location, or single mobile device, when using real-time location updates from each of the mobile devices can significantly improving the sorting calculation and decision process when compared to Line-Of-Sight (LOS) distance calculations which are currently used in the prior art. As people skilled in the art will appreciate, calculating the estimated route in real-time, or based on the current position information for each mobile device, will significantly improve the decision making process in determining which mobile device is closest to the central point. For example, as illustrated in FIG. 25 showing a map display with various location points 2501, 2502, 2503, 2504, 2505, 2506, & 2507, which each represent the location of either a mobile device 2502, 2503, 2504, 2505, 2506, & 2507, and the location of a house (i.e., POI) 2501. The location of the house 2501 represents the pick-up location, as in a dispatching software application, where the person at the house wants to receive transportation to the airport from a cab. The requirements for this customer are that they need a vehicle with a capacity to hold 3 passengers to pick them up at the house in 15 minutes. The local dispatch application computes the vehicle best suited to meet the customer's needs by first performing a search for vehicles in the area that can support 3 or more passengers, and then calculating the estimated route for each of the mobile vehicles from their current location to the pick-up location.

The estimated route preferably uses the provided map data to calculate the route, and is based on various vehicle-specific route preferences and map data information, such as one-way streets, posted road speeds, turn restrictions, etc. As illustrated in FIG. 25, there are specific estimated routes 2508, 2509, 2510, 2511, 2512, & 2513 for each of the mobile vehicles' current locations 2502, 2503, 2504, 2505, 2506, & 2507, respectively. Each of the estimated routes is relative to the map data's road network. The sort order of the mobile vehicles is further illustrated by the numbering of each vehicle's position 2502, 2503, 2504, 2505, 2506, & 2507, where the lower the number is (i.e., two (2) is the closet), the closer to the pick-up location 2501 the vehicle is. The pick-up location is shown as the numeral one (1) in FIG. 25.

Figure 26:
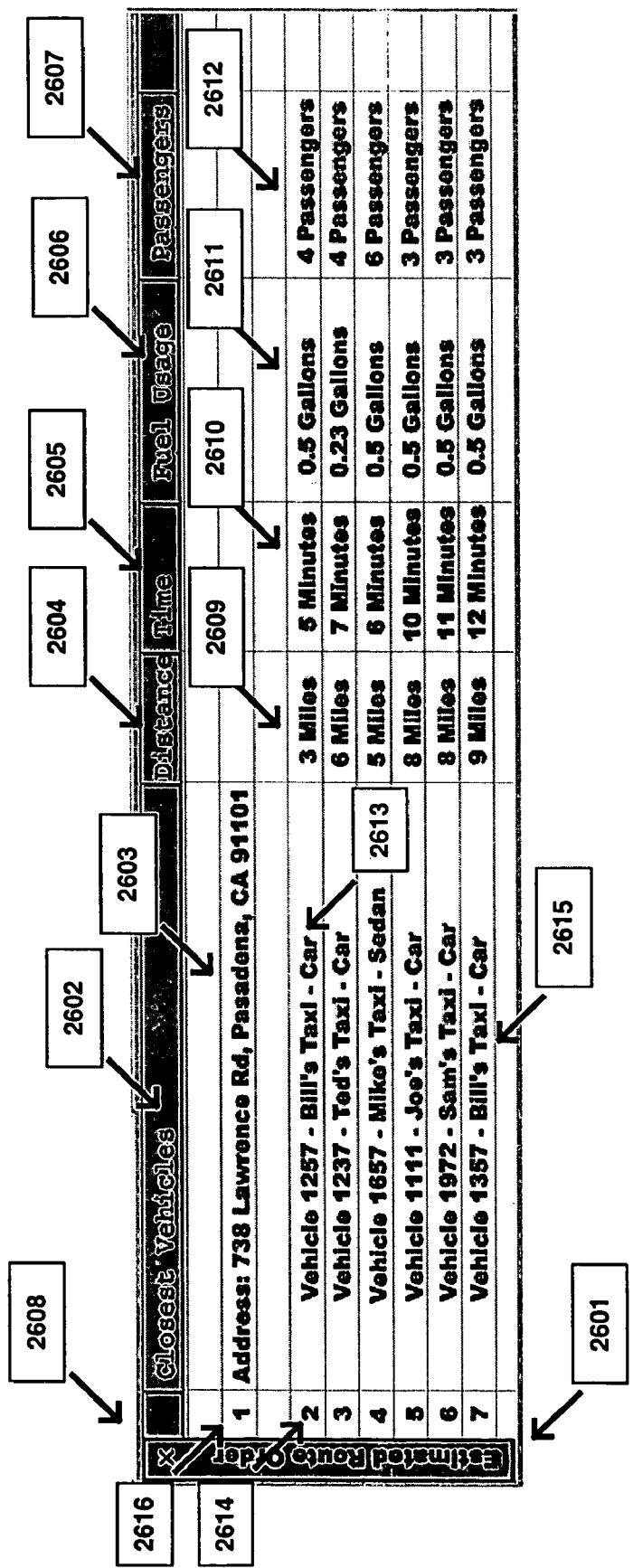
FIG. 26 illustrates still another aspect of the present invention for graphically displaying the sorting order of the previous figure's estimated route calculation.

FIG. 26 illustrates an accompanying window 2601 for the map display of FIG. 25 and shows the various metrics, such as distance 2604, time 2605, fuel usage 2606, and number of passengers 2607, that the dispatch application user can use to determine the 'closest' 2602 mobile vehicle relative to the pick-up location 2501, according to the calculation of each mobile vehicle's estimated route to the customer's location 2501. The sorting order of the illustrated mobile vehicles 2502, 2503, 2504, 2505, 2506, & 2507, is based on, in this embodiment, the time 2605 and distance 2604 required to arrive at the customer's address 2603 location 2501. Each vehicle is sorted based on 1). its being the closest (i.e., distance 2604) to the customer's 2501 address 2603, and 2). it requiring the least amount of travel time 2605 from each mobile vehicle's current location 2502, 2503, 2504, 2505, 2506, & 2507, to the customer's pick-up location 2501, which was originally derived from the customer's address 2603 information. The mobile vehicle that is 'closest' 2602 to the pick-up location 2051 is illustrated as "Vehicle 1257—Bill's Taxi—Car" 2613, along side other information such as the driver's name and the type of taxi (i.e., a car). The sorting order indicates that this vehicle 2613 is the closest vehicle to the pick-up location 2501, since it is numbered as two (2) 2614 (i.e., the closest number to the address location, numbered (1) 2616) on the current sort display 2601. The "Estimated Route Order" display 2601 also illustrates various driving metrics to the pick-up location, such as distance (i.e., 3 miles 2609), time 2605 (i.e., 5 minutes 2610), fuel usage 2610 (i.e., 0.5 gallons 2611), and information about its vehicle, such as the number of passengers 2607 (i.e., 4 passengers 2612). The fuel usage field 2606 is preferably calculated based on the specific vehicle's fuel compensation and the total travel distance and time.

It should be noted that the present invention may be embodied in forms other than the preferred embodiments described above without departing from the spirit or essential characteristics thereof. The specification contained herein provides sufficient disclosure for one skilled in the art to implement the various embodiments of the present invention, including the preferred embodiment, which should be considered in all aspect as illustrative and not restrictive; all changes or alternatives that fall within the meaning and range or equivalency of the claim are intended to be embraced within.

What we claim:

1. A method of providing predictive position information for a mobile communication device, said method comprising the steps of:

receiving position information of the mobile communication device, said position information indicating a first position of the mobile communication device;

receiving updated position information of the mobile communication device, said updated position information indicating a second position of the mobile communication device;

accessing a map database, said map database containing mapping information for a geographical area;

using the mapping information, displaying a graphical representation of a map, said map including routes of travel;

using the position information and the updated position information, determining a speed of travel of said mobile communication device;

using said determined speed of travel, calculating a predictive position of the mobile communication device at a point in time ahead of the real time;

displaying, on the graphical representation of the map, the predictive position of the mobile communication device at said point in time ahead of the real time;

calculating an alternative predictive position of the mobile communication device; and displaying, on the graphical representation of the map, the alternative predictive position of the mobile communication device.

2. The method according to claim 1, further comprising the step of displaying, on the graphical representation of the map, the first and the second positions of the mobile communication device.

3. The method according to claim 1, further comprising the step of receiving destination information of the mobile communication device.

4. The method according to claim 1, further comprising the step of transmitting the predictive position information.

5. The method according to claim 1, wherein the mapping information includes position information of a plurality of points of interest located within the geographical area.

6. The method according to claim 1, wherein the position information and the updated position information are received in real time, and wherein the predictive position information is calculated and displayed in real time.

7. The method according to claim 1, wherein the position information and the updated position information is received from a satellite.

8. The method according to claim 1, wherein the mapping information includes route information of the geographical area, said route information including a plurality of routes of travel.

9. The method according to claim 8, further comprising the steps of:
generating an adjusted predictive position by correlating the predictive position of the mobile communication device with a position on a route of travel nearest to the predictive position; and
displaying the adjusted predictive position.

10. The method according to claim 8, further comprising the step of transmitting the adjusted predictive position.

11. The method according to claim 5, further comprising the steps of transmitting position information of one of said plurality of points of interest.

12. The method according to claim 11, wherein said one point of interest is, relative to the other points of interests, nearest to the predictive position of the mobile communication device.

13. The method according to claim 8, further comprising the step of receiving user preference information, said user preference information includes the user preferred routes of travel.

14. The method according to claim 13, further comprising the step of using the user preference information to generate an adjusted predictive position.

15. The method according to claim 1, further comprising the step of displaying an estimate time of arrival at the predictive position.

16. The method according to claim 8, wherein the route information includes one of speed limit information for the routes of travel and traffic stop information for the routes of travel.

17. The method according to claim 16, further comprising the step of calculating an estimate time of arrival at the predictive position, wherein said estimated time of arrival is calculated using one of the speed limit information and the traffic stop information for the routes of travel.

18. The method according to claim 1, wherein the map database is stored within the mobile communication device.

19. A computer-readable medium encoded with a computer program for causing a computer processor to generate predictive position information for a mobile communication device by causing the processor to execute the steps of:
receiving position information of the mobile communication device, said position information indicating a first position of the mobile communication device;
receiving updated position information of the mobile communication device, said updated position information indicating a second position of the mobile communication device;
accessing a map database, said map database containing mapping information for a geographical area;
using the mapping information, displaying a graphical representation of a map, said map including routes of travel;
using the position information and the updated position information, determining a speed of travel of said mobile communication device;
using said determined speed of travel, calculating a predictive position of the mobile communication device at a point in time ahead of the real time;
displaying, on the graphical representation of the map, the predictive position of the mobile communication device at said point in time ahead of the real time;
calculating an alternative predictive position of the mobile communication device; and
displaying, on the graphical representation of the map, the alternative predictive position of the mobile communication device.

20. The computer-readable medium according to claim 19, wherein the medium includes further instructions for causing the processor to execute the step of displaying, on the graphical representation of the map, the first and the second positions of the mobile communication device.

21. The computer-readable medium according to claim 19, wherein the medium includes further instructions for causing the processor to execute the step of receiving destination information of the mobile communication device.

22. The computer-readable medium according to claim 19, wherein the medium includes further instructions for causing the processor to execute the step of transmitting the predictive position information.

23. The computer-readable medium according to claim 19, wherein the mapping information includes position information of a plurality of points of interest located within the geographical area.

24. The computer-readable medium according to claim 19, wherein the position information and the updated position information are received in real time, and wherein the predictive position information is calculated and displayed in real time.

25. The computer-readable medium according to claim 19, wherein the position information and the updated position information are received from a satellite.

26. The computer-readable medium according to claim 19, wherein the mapping information includes route information of the geographical area, said route information including a plurality of routes of travel.

27. The computer-readable medium according to claim 26, wherein the program causes the processor to further execute the steps of:
generating an adjusted predictive position by correlating the predictive position of the mobile communication device with a position on a route of travel nearest to the predictive position; and
displaying the adjusted predictive position.

28. The computer-readable medium according to claim 26, wherein the program causes the processor to further execute the step of transmitting the adjusted predictive position.

29. The computer-readable medium according to claim 23, wherein the program causes the processor to execute the further steps of transmitting position information of one of said plurality of points of interest.

30. The computer-readable medium according to claim 29, wherein said one point of interest is, relative to the other points of interests, nearest to the predictive position of the mobile communication device.

31. The computer-readable medium according to claim 26, wherein the program causes the processor to execute further the step of receiving user preference information, said user preference information includes the user preferred routes of travel.

32. The computer-readable medium according to claim 19, wherein the program causes the processor to execute the further step of using the user preference information to generate an adjusted predictive position.

33. The computer-readable medium according to claim 19, wherein the program causes the processor to execute the further step of displaying an estimate time of arrival at the predictive position.

34. The computer-readable medium according to claim 26, wherein the route information includes one of speed limit information for the routes of travel and traffic stop information for the routes of travel.

35. The computer-readable medium according to claim 34, wherein the medium includes further instructions for causing the processor to execute the step of calculating an estimate time of arrival at a final destination position, wherein said estimated time of arrival is calculated using one of the speed limit information and the traffic stop information for the routes of travel.

36. The computer-readable medium according to claim 19, wherein the map database is stored within the mobile communication device.

37. A method for providing predictive travel information for a plurality of mobile devices, said method comprising the steps of:
receiving real-time position information from each of said plurality of mobile devices, said real-time position information including at least one positional information of the corresponding mobile device;
accessing a map database, said map database including map data of a geographical area;
displaying a graphical mapping representation of the geographical area, said graphical mapping representation including a network of known paths of travel;
displaying, on the graphical mapping representation, at least one real-time position of each of said plurality of mobile devices along said network of known paths;
determining a speed of travel for each of said plurality of mobile devices;
using the determined speeds of travel, calculating a predictive position along said network of known paths for each of said plurality of mobile devices for a point in time ahead of the real time;
displaying, on the graphical mapping representation, the predictive position for each of said plurality of mobile devices along said network of known paths at said point in time,
wherein the at least one real-time position of each of said plurality of mobile devices and the predictive position for each of said plurality of mobile devices are displayed along said network of known paths at the same time.

38. The method according to claim 37, further comprising the step of calculating a predictive route of travel for each of said plurality of mobile device, said predictive route of travel originating from a real-time position of the mobile device and terminating at a central destination position.

39. The method according to claim 38, further comprising the step of estimating a time of arrival by each of the mobile device to the central destination.

40. The method according to claim 38, further comprising the step of estimating a position of intercept by each of said plurality of mobile devices with the central destination.

41. The method according to claim 40, further comprising the step of estimating a time of intercept by each of said plurality of mobile devices with the central destination.

42. The method according to claim 38, wherein said central destination is a stationary address.

43. The method according to claim 37, further comprising the step of receiving user travel preference information from each mobile device, said user travel preference information including user preferences for specific routes of travel within the network of known paths.

44. The method according to claim 37, wherein said map data further includes one of speed limits for each route of travel and traffic stop locations for each route of travel.

45. A computer-readable medium encoded with a program for causing a processor to providing predictive travel information for a plurality of mobile devices by executing the steps of:
receiving real-time position information from each of said plurality of mobile devices, said real-time position information including at least one positional information of the corresponding mobile device;
accessing a map database, said map database including map data of a geographical area;
displaying a graphical mapping representation of the geographical area, said graphical mapping representation including a network of known paths of travel;
displaying, on the graphical mapping representation, at least one real-time position of each of said plurality of mobile devices along said network of known paths;
determining a speed of travel for each of said plurality of mobile devices;
using the determined speeds of travel, calculating a predictive position alone said network of known paths for each of said plurality of mobile devices for a point in time ahead of the real time;
displaying, on the graphical mapping representation, the predictive position for each of said plurality of mobile devices along said network of known paths at said point in time,
wherein the at least one real-time position of each of said plurality of mobile devices and the predictive position for each of said plurality of mobile devices are displayed along said network of known paths at the same time.

46. The computer-readable medium according to claim 45, wherein the program causes the processor to execute the further step of calculating a predictive route of travel for each of said plurality of mobile device, said predictive route of travel originating from a real-time position of the mobile device and terminating at a central destination position.

47. The computer-readable medium according to claim 46, wherein the program causes the processor to execute the further step of estimating a time of arrival by each of the mobile device to the central destination.

48. The computer-readable medium according to claim 46, wherein the program causes the processor to execute the further step of estimating a position of intercept by each of said plurality of mobile devices with the central destination.

49. The computer-readable medium according to claim 48, wherein the program causes the processor to execute the further step of estimating a time of intercept by each of said plurality of mobile devices with the central destination.

50. The computer-readable medium according to claim 46, wherein said central destination is a stationary address.

51. The computer-readable medium according to claim 45, wherein the program causes the processor to execute the further step of receiving user travel preference information from each mobile device, said user travel preference information including user preferences for specific routes of travel within the network of known paths.

52. The computer-readable medium according to claim 45, wherein said map data further includes one of speed limits for each route of travel and traffic stop locations for each route of travel.

53. The method of claim 1, wherein the predictive position and the alternative predictive position are displayed at the same time.

54. The computer-readable medium of claim 19, wherein the predictive position and the alternative predictive position are displayed at the same time.

55. A mobile communication device comprising:
   means for receiving position information of the mobile communication device, said position information indicating a first position of the mobile communication device;
   means for receiving updated position information of the mobile communication device, said updated position information indicating a second position of the mobile communication device;
   means for accessing a map database, said map database containing mapping information for a geographical area;
   means for using the mapping information, displaying a graphical representation of a map, said map including routes of travel;
   means for using the position information and the updated position information, determining a speed of travel of said mobile communication device;
   means for using said determined speed of travel, calculating a predictive position of the mobile communication device at a point in time ahead of the real time;
   means for displaying, on the graphical representation of the map, the predictive position of the mobile communication device at said point in time ahead of the real time;
   means for calculating an alternative predictive position of the mobile communication device; and
   means for displaying, on the graphical representation of the map, the alternative predictive position of the mobile communication device.

56. The mobile communication device of claim 55, wherein the predictive position and the alternative predictive position are displayed at the same time.

57. A mobile communication device for providing predictive travel information for a plurality of mobile devices, said method comprising the steps of:
   means for receiving real-time position information from each of said plurality of mobile devices, said real-time position information including at least one positional information of the corresponding mobile device;
   means for accessing a map database, said map database including map data of a geographical area;
   means for displaying a graphical mapping representation of the geographical area, said graphical mapping representation including a network of known paths of travel;
   means for displaying, on the graphical mapping representation, at least one real-time position of each of said plurality of mobile devices along said network of known paths;
   means for determining a speed of travel for each of said plurality of mobile devices;
   means for using the determined speeds of travel, calculating a predictive position along said network of known paths for each of said plurality of mobile devices for a point in time ahead of the real time;
   means for displaying, on the graphical mapping representation, the predictive position for each of said plurality of mobile devices along said network of known paths at said point in time,
   wherein the at least one real-time position of each of said plurality of mobile devices and the predictive position for each of said plurality of mobile devices are displayed along said network of known paths at the same time.

* * * * *